United States Patent
Hayashi et al.

(10) Patent No.: US 8,659,773 B2
(45) Date of Patent: Feb. 25, 2014

(54) IMAGE SENDING APPARATUS AND PREVIEW DISPLAY METHOD

(75) Inventors: Terumi Hayashi, Osaka (JP); Masanori Matsumoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 1022 days.

(21) Appl. No.: 12/633,169

(22) Filed: Dec. 8, 2009

(65) Prior Publication Data

US 2010/0149589 A1 Jun. 17, 2010

(30) Foreign Application Priority Data

Dec. 16, 2008 (JP) .................................. 2008-319796

(51) Int. Cl.
G06F 3/12 (2006.01)
G06K 15/02 (2006.01)
G06K 15/00 (2006.01)
G06F 17/24 (2006.01)

(52) U.S. Cl.
USPC ........... 358/1.15; 358/1.2; 358/1.9; 358/3.12; 715/274

(58) Field of Classification Search
None
See application file for complete search history.

(56) References Cited

U.S. PATENT DOCUMENTS

| | | | |
|---|---|---|---|
| 2004/0125396 A1* | 7/2004 | Burke | 358/1.13 |
| 2005/0047659 A1 | 3/2005 | Tanaka | |
| 2006/0066899 A1 | 3/2006 | Yoshida | |
| 2007/0030510 A1* | 2/2007 | Horiuchi | 358/1.15 |
| 2011/0106903 A1* | 5/2011 | Lowe | 709/206 |

FOREIGN PATENT DOCUMENTS

| | | |
|---|---|---|
| JP | 2005-073015 | 3/2005 |
| JP | 2006-127478 | 5/2006 |
| JP | 2009-260665 | 11/2009 |

* cited by examiner

*Primary Examiner* — Thomas Lett
(74) *Attorney, Agent, or Firm* — Renner, Otto, Boisselle & Sklar, LLP

(57) ABSTRACT

Provided is an image sending apparatus capable of preventing an erroneous sending effectively using a preview display without causing a user to feel troublesome with unnecessary confirmation operation. An image forming apparatus (illustrated as a digital multi-functional peripheral) is provided with a setting storage portion (illustrated as a control memory) for storing setting information (illustrated as a table) related to a preview display by a display control portion (illustrated as a panel control portion) for each sending destination. The setting information includes forcible execution information showing whether or not a preview image is displayed forcibly by the display control portion. The display control portion performs a display control based on the stored setting information.

10 Claims, 12 Drawing Sheets

| ADDRESS | PREVIEW | SEND PERMIT CONDITIONS |
|---|---|---|
| HEAD OFFICE | REDUCTION ENTIRE DISPLAY | CONFIRMATION UP TO FINAL PAGE |
| A COMPANY | — | — |
| GROUP K | TWICE ENLARGEMENT DISPLAY | CONFIRMATION UP TO FINAL PAGE BY SAME SIZE ENLARGEMENT |
| ⋮ | ⋮ | ⋮ |

IMAGE SENDING APPARATUS AND PREVIEW DISPLAY METHOD

CROSS-NOTING PARAGRAPH

This non-provisional application claims priority under 35 U.S.C. §119 (a) on Patent Application No. 2008-319796 filed in JAPAN on Dec. 16, 2008, the entire contents of which are hereby incorporated herein by reference.

FIELD OF THE INVENTION

The present invention relates to an image sending apparatus capable of displaying a preview of image data before sending, and a preview display method.

Conventionally, some image forming apparatuses such as multi-functional peripherals have a function of displaying a preview of image data that is the object of the output to be printed or sent.

Japanese Laid-Open Patent Publication No. 2005-73015 discloses a technique which determines whether image data displayed for previewing is a character image or a gradation image, and when it is a character image, displays the image by setting a preview magnification as to be enough to recognize the characters.

Furthermore, in image sending apparatuses that perform sending of image data or image forming apparatuses such as multi-functional peripherals that have a sending function, when sending is performed while an error is made in a sending destination or image data to be sent, problems related to security occur. Accordingly, an approach of preventing an erroneous sending in image sending apparatuses is desired.

However, in a case of performing a previous confirmation to prevent an erroneous sending by using a conventional preview function, a preview display is performed for all sending processing, or a user needs to select whether or not a preview display is performed for each sending processing.

When the former is employed, displaying a preview for the ones unnecessary to confirm by the preview display is caused to be performed, thus causing a user to feel it troublesome. When the latter is employed, whether or not displaying a preview is left to a user's determination, therefore, as well as the possibility that the erroneous sending is able to be prevented is lowered, the prevention of the erroneous sending is not able to be controlled on a side of an apparatus (that is, on a side of an administrator), there is a administrative problem.

In addition, even in the case of performing the confirmation by displaying a preview, when the confirmation is performed similarly for every sending processing, the erroneous sending is not able to be prevented effectively, since there is a case where a point (confirmation point which is important) that needs not to be mistaken in accordance with a sending destination (a destination) is different.

For example, when a sending destination is a very important client, before sending an original, the original to be sent is confirmed by displaying a preview without fail and when confirming, one displayed in reduction is to be displayed in enlargement and contents therein needs to be confirmed entirely up to the final page. Contrary to this, in the case of an ordinary client, confirmation of an entire image by a display in reduction is only required. In addition, for a sending destination to which one is able to send without being especially conscious of, a preview display itself is not necessary.

Furthermore, even when a preview function described in Japanese Laid-Open Patent Publication No. 2005-73015 is used, these problems are not able to be solved, since the preview display is performed independent of the sending destination.

SUMMARY OF THE INVENTION

An object of the present invention is to provide an image sending apparatus and a preview display method capable of preventing an erroneous sending effectively using a preview display without causing a user to feel troublesome with unnecessary confirmation operations.

Another object of the present invention is to provide an image sending apparatus having a display portion, a preview image generating portion that generates a preview image of image data to be sent, a display control portion that displays the preview image generated by the preview image generating portion on the display portion, and a sending portion that sends the image data to be sent, comprising: a setting storage portion that stores, for each sending destination, setting information related to a preview display by the display control portion, wherein the setting information includes forcible execution information showing whether or not the preview image is forcibly displayed by the display control portion; and the display control portion performs display control based on the setting information stored in the setting storage portion.

Another object of the present invention is to provide the image sending apparatus, wherein the display control portion performs, when there are a plurality of sending destinations of the image data to be sent and any one of the plurality of destinations includes the forcible execution information requesting for forcible display of the preview image, a control to display the preview image forcibly as the display control based on the setting information.

Another object of the present invention is to provide the image sending apparatus, wherein when the forcible execution information shows that the preview image is forcibly displayed, the setting information includes a display magnification value in displaying the preview image by the display control portion.

Another object of the present invention is to provide the image sending apparatus, wherein the display control portion performs, when there are a plurality of sending destinations of the image data to be sent and any one of the plurality of sending destinations is the sending destination in which the setting information includes the display magnification value, a control to display the preview image forcibly by the largest display magnification value among the display magnification values for the plurality of destinations as the display control based on the setting information.

Another object of the present invention is to provide the image sending apparatus, wherein the setting storage portion stores permission information, which shows whether sending of the image data is permitted only after the preview image for all pages of the image data to be sent is displayed by the display control portion or sending of the image data is permitted independent of displaying the preview image, as a part of the setting information, and the display control portion displays, when the permission information is information showing that sending of the image data is permitted only after displaying the preview image for all the pages of the image data to be sent, a send start key so as to be selectable by a user only after the preview image is displayed for all the pages.

Another object of the present invention is to provide a preview display method in an image sending apparatus having a display portion, a preview image generating portion that generates a preview image of image data to be sent, a display control portion that displays a preview image generated by the preview image generating portion on the display portion, and a sending portion that sends the image data to be sent, including: a step in which a setting storage portion stores, for each sending destination, setting information that is related to a preview display by the display control portion and includes forcible execution information showing whether or not the preview image is forcibly displayed by the display control portion; and a step in which the display control portion performs display control based on the setting information stored in the setting storage portion.

PREFERRED EMBODIMENTS OF THE INVENTION

Now, a preferred embodiment of the present invention will hereinafter be described with reference to the drawings. An embodiment in which an image sending apparatus according to the present invention is applied to an image sending apparatus, more particularly, an embodiment applied to a digital multi-functional peripheral having a print function, a copy function, and a facsimile sending and receiving function, etc., will hereinafter be described specifically with reference to the drawings showing the embodiment.

<Apparatus Configuration>

Figure 1:
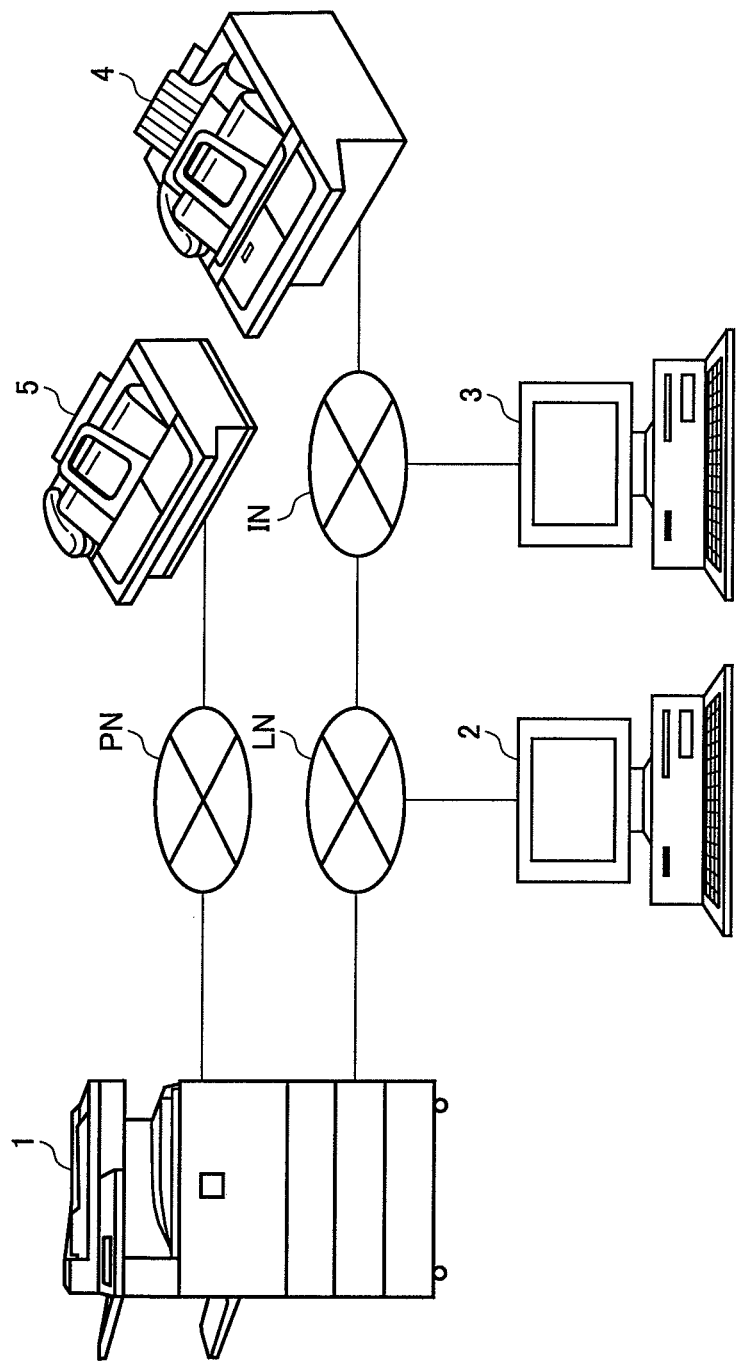
FIG. 1 is a schematic diagram for showing an exemplary configuration of an image processing system constructed by using a digital multi-functional peripheral as an example of an image sending apparatus according to an embodiment of the present invention.

FIG. 1 is a schematic diagram for showing an exemplary configuration of an image processing system constructed by using a digital multi-functional peripheral as an example of an image sending apparatus according to an embodiment of the present invention. In FIG. 1, 1 denotes a digital multi-functional peripheral, 2 and 3 denote external computers, denotes an internet facsimile apparatus (internet FAX apparatus), and 5 denotes a facsimile apparatus.

The digital multi-functional peripheral 1 has a function of sending and receiving image data by facsimile (facsimile function) and/or a function of sending and receiving image data by internet FAX (internet FAX function), as well as a print function and a copy function. This digital multi-functional peripheral 1 is connected to various external devices through a communication network. For example, an external computer 2 such as a personal computer (PC) is connected to a communication network LN that is laid as a local communication network, and an external computer 3 and an internet FAX apparatus 4 are connected to an internet network IN that is connected through a gateway not shown in the figure, or the like. Further, an external facsimile apparatus 5 is connected through a public switched telephone network PN. Note that, as described above, although description will be given only for the case where the image forming apparatus according to the present invention is applied to the digital multi-functional peripheral 1, the internet FAX apparatus 4 and the facsimile apparatus 5 are also applicable as the image forming apparatus according to the present invention.

Figure 2:
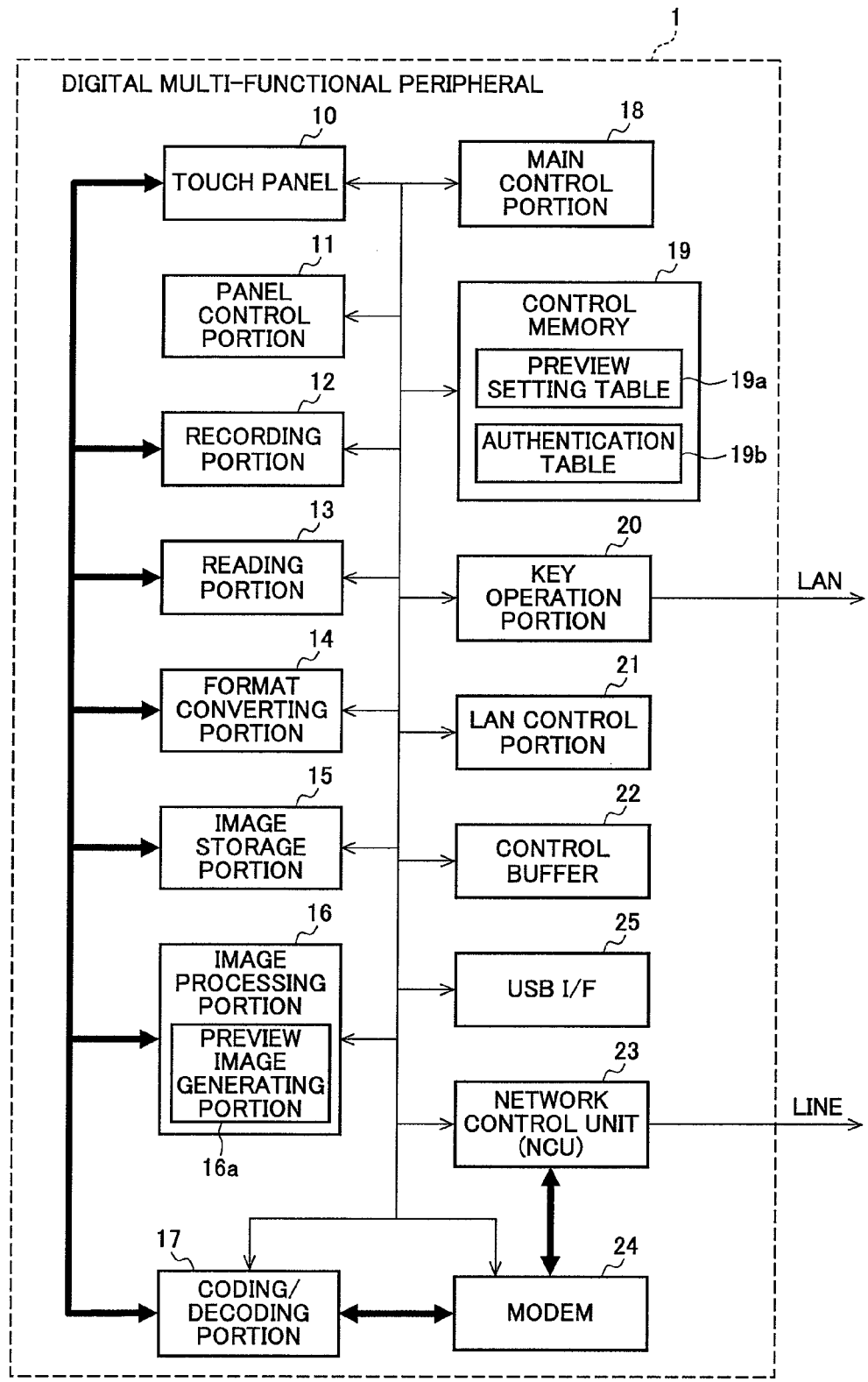
FIG. 2 is a schematic block diagram for showing an exemplary configuration of the digital multi-functional peripheral of FIG. 1.
Figure 3:
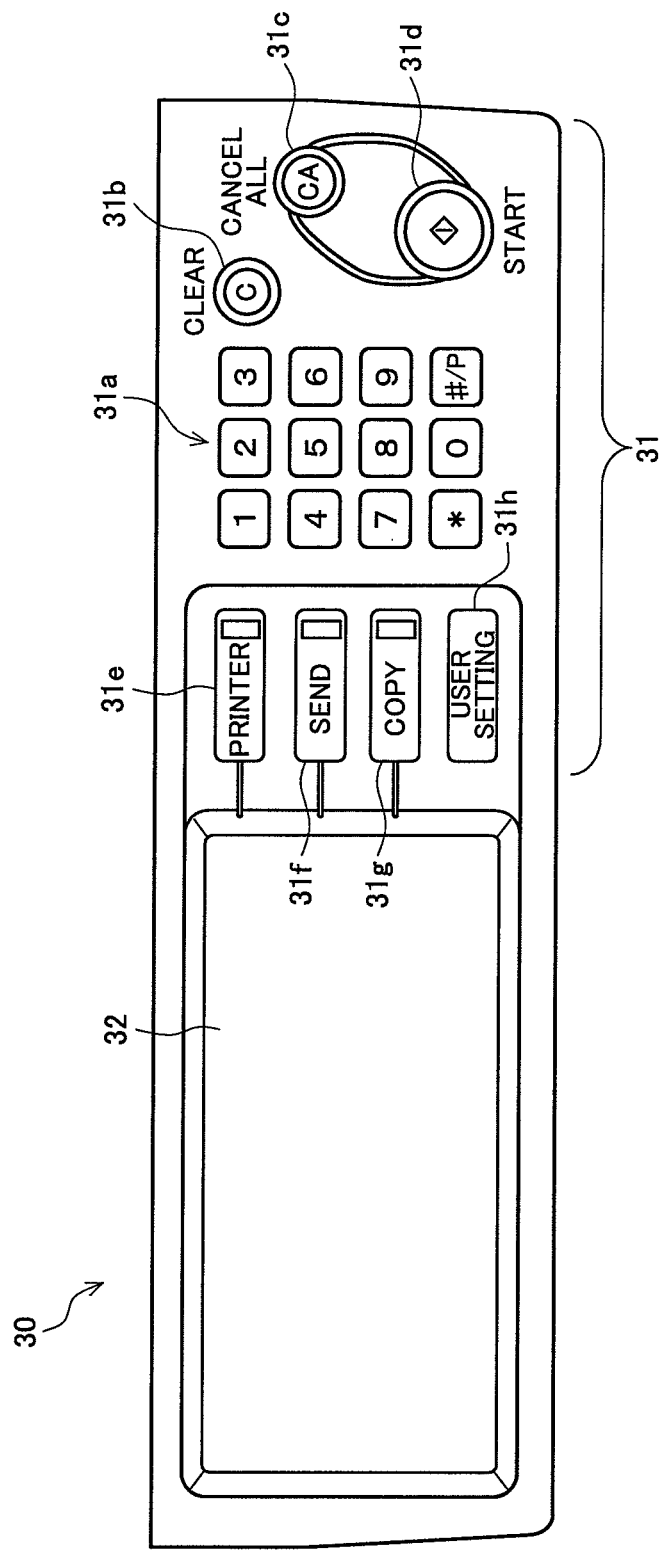
FIG. 3 is an external view for showing an example of a touch panel and a key operation portion in the digital multi-functional peripheral of FIG. 2.

Description will be given for a configuration and an operation of the digital multi-functional peripheral 1. FIG. 2 is a schematic block diagram for showing an exemplary configuration of the digital multi-functional peripheral of FIG. 1, and FIG. 3 is an external view for showing an example of a touch panel and a key operation portion of the digital multi-functional peripheral of FIG. 2.

The digital multi-functional peripheral 1 illustrated in FIG. 2 is provided with a touch panel 10, a panel control portion 11, a recording portion 12, a reading portion 13, a format converting portion 14, an image storage portion 15, an image processing portion 16, a coding/decoding portion 17, a main control portion 18, a control memory 19, a key operation portion 20, a LAN (Local Area Network) control portion 21, a control buffer 22, a network control unit (NCU) 23, a modem 24, and a USB (Universal Serial Bus) interface (I/F) 25. In addition, the digital multi-functional peripheral 1 may be provided with a post processing apparatus that performs the punching and the stapling, and description will hereinafter be given with reference to an embodiment provided with the post processing apparatus.

The main control portion 18 is comprised of a CPU (Central Processing Unit), a DSP (Digital Signal Processor), or the like. The control memory 19 is comprised of a nonvolatile memory or the like, such as a ROM (Read Only Memory) or an EEPROM (Electrically Erasable and Programmable ROM). A program (firmware) and various setting data are stored in the control memory 19 so as to be readable from the main control portion 18. Among them, at least the various setting data is stored in a rewritable memory. As a part of the setting data, a preview setting table 19a and an address book table 19b which will be described below are stored so as to be rewritable in the control memory 19. The program and the various setting data may be stored in a hard disc as an exemplary configuration of the image storage portion 15, which will be described below. The control buffer 22 is comprised of a volatile memory such as a RAM (Random Access Memory).

The above-described program is for the main control portion 18 to issue a command related to generation and display of a preview image as will be described below according to the present invention, a command related to generation, sending, receiving and the like of a facsimile image, an electronic mail, and the like, a command related to original reading, a command related to printing, a command related to original reading and printing (that is, copying), and the like, to other parts. The program is downloaded by the main control portion 18 to the control buffer 22 and executed by referring to various setting data in the control memory 19 appropriately using the control buffer 22 as a data region for temporary storage (work).

The reading portion 13 reads an original as a bitmap image of RGB (R: Red, G: Green, and B: Blue) with a predetermined resolution by a scanner using a CCD (Charge Coupled Device) and outputs the read RGB image data (dot image data) to the image processing portion 16. The image processing portion 16 is comprised of an ASIC (Application Specific Integrated Circuit) or the like, and applies every kind of image processing to target image data. An example of the image processing will be described below. The ASIC may be incorporated with other parts such as the coding/decoding portion 17.

The image storage portion 15 is comprised of hard disc or the like, and stores image data that has been read by the reading portion 13 and has passed through the image processing portion 16, image data that has been received from outside through the LAN control portion 21, the NCU 23, etc., and the like. When image data is stored in the image storage portion 15, data that has been coded by the coding/decoding portion 17 may be also stored. Moreover, the image storage portion 15 may temporarily save intermediate data generated during image processing at the image processing portion 16.

The coding/decoding portion 17 compresses image data by coding and decodes (expands) the coded image data to original image data. For example, the coding/decoding portion 17 performs coding of image data read from an original, decoding of the coded data, decoding of coded image data received from outside, and the like. In the coding/decoding portion 17, coding systems corresponding to purposes are usable, including JPEG (Joint Photographic Experts Group) that is generally used in filing, and MH (Modified Huffman), MR (Modified READ) and MMR (Modified Modified READ) that are generally used in facsimile communication. As the coding system, MH is employable in IP facsimile communication, and JPEG and JBIG (Joint Bi-level Image Experts Group) as well as MH, MR, and MMR are employable in internet facsimile communication.

The format converting portion 14 converts read image data or image data received from outside into a predetermined file format such as a PDF (Portable Document Format), a GIF (Graphics Interchange Format), or a TIFF (Tag Image File Format).

The recording portion 12 is provided with a printer apparatus that employs a printing system such as an electrophotographic system or an inkjet system, and records (that is, prints) image data and the like stored in the image storage portion 15 on recording paper. The USB I/F 25 is an I/F for connecting to a USB device such as a USB memory, and outputs image data and the like after original reading that is stored in the image storage portion 15 to the USB device or reads a file from the USB device.

The modem 24 is comprised of a facsimile modem capable of facsimile communication, and is connected to a telephone line and is directly connected to the NCU 23. The NCU 23 is connected to the telephone line to control the line. That is, the NCU 23 is a hardware that performs an operation of closing and opening the line with an analogue public switched telephone network (PSTN), and connects the modem 24 to the public switched telephone network as the occasion demands. Such a configuration enables to send image data stored in the image storage portion 15 to outside by facsimile, to receive facsimile image data from the telephone line to store in the image storage portion 15, or to print by the recording portion 12 directly.

The LAN control portion 21 is connected to a LAN and performs communication of electronic mail data and communication of internet FAX via an internet. The internet FAX uses a LAN interface or the like to send and receive an electronic mail through a computer network such as a LAN.

The touch panel 10 or the key operation portion 20 receives an operation for selecting desired processing out of processing of reading an original, processing of sending and printing image data, etc., an operation for staring the processing, an operation for performing a setting that is necessary when each processing is executed (a selecting operation or an inputting operation), and the like. Various examples of the setting include a setting of the number of printed sheets in printing, a setting of punching and stapling and a setting of destination information in sending a facsimile image or an electronic mail.

The key operation portion 20 is provided with a key group necessary for operations. The touch panel 10 has a display portion and an operation receiving portion such as a touch sensor. The touch panel 10 is subjected to display control and operation reception control by the panel control portion 11. That is, the panel control portion 11 performs the display control for the display portion and the operation reception control for the operation receiving portion in the touch panel 10.

On the display portion of the touch panel 10, a current operating state, setting information (for example, sending destination, etc.,) and the like are displayed. The display is realized when the panel control portion 11 performs control to display a GUI (Graphical User Interface) image. The GUI enables to change the display and an operation received position depending on a user operation. Each GUI and an image thereof may be stored so as to be readable in an internal memory of the panel control portion 11 or the control memory 19. In addition, as the display portion, display devices in various display systems including liquid crystal displays and organic EL (Electroluminescence) displays are employable.

The user operation received on the touch panel 10 is interpreted by the panel control portion 11 and is transmitted as an operation signal to the main control portion 18. The user operation received by the key operation portion 20 is interpreted by the key operation portion 20 itself and transmitted as an operation signal to the main control portion 18. The main control portion 18 issues a command in accordance with the operation signal obtained in this manner to other parts to cause the other parts to execute processing in accordance with the user operation. Note that, although description has been given with reference to the touch panel 10 in which the display device and the operation portion are integrated, only the display apparatus may be simply provided instead of the touch panel 10 and, in that case, where the user operation is received only by the key operation portion 20.

The touch panel 10 and the key operation portion 20 may be configured as an operation panel 30 as illustrated in FIG. 3, and the operation panel 30 is comprised of a key operation portion 31 (corresponding to the key operation portion 20) provided with various hardware keys and a touch panel 32 (corresponding to the touch panel 10) comprised of a liquid crystal display and a touch sensor. The present invention will hereinafter be described in detail with the touch panel 32 and the key operation portion 31 applied in the configuration of FIG. 1 instead of the touch panel 10 and the key operation portion 20.

The key operation portion 31 is provided with, as hardware keys, function switch keys 31e, 31f, and 31g for switching a print function, a sending function and a copy function, and a system setting key 31h for receiving a setting by a user (mainly an administrative user) as well as a numeric keypad 31a for inputting numeric values, a clear key 31b for clearing input set values, a cancel all key 31c for canceling all of input various settings, and a start key 31d for receiving instructions of start of copying, start of sending, etc.

An exemplary operation in the digital multi-functional peripheral 1 having the above-described exemplary configuration will be described.

<Original Reading Operation>

An original reading operation is performed when image data of a read original is stored (filed) in the image storage portion 15, when image data of a read original is sent to outside, when image data of a read original is printed (that is, copied), and the like.

When a user operation to perform processing requiring original reading is received by the operation panel 30, the main control portion 18 gives an instruction to the reading portion 13, the image storage portion 15, the image processing portion 16, the coding/decoding portion 17, and the like to execute processing as will be described below.

The reading portion 13 optically reads an image of an original placed on a document platen or an automatic document feeder and provides the image processing portion 16 with RGB image data (bitmap data of RGB) as a result of reading. The image processing portion 16 executes various image processing (hereinafter, referred to as original image processing) such as A/D conversion, shading correction, and γ correction for the RGB image data. Here, the shading processing is processing to remove various distortions generated in an illumination system, an image focusing system, and an image sensing system of the reading portion 13.

As the original image processing, original determination processing and segmentation processing may be executed subsequently to the A/D conversion, the shading correction, and the γ correction. The original determination processing includes processing of determining a type of the original and processing of determining whether the original is a color original or a monochromatic original based on input image data (image data after the application of the γ correction in this case). Examples of the type of the original include a text original, a printed photograph original, and text and printed photograph original in combination thereof. The image processing portion 16 outputs a determination signal (hereinafter, referred to as original determination data) as a result of the original type determination processing and the monochromatic/color original determination processing. The segmentation processing is processing of determining to what kind of area each pixel of the input image data (image data after the application of the γ correction in this case) belongs, and an example thereof includes processing of determining to which area including a black text area, a color text area and a halftone area each pixel belongs. The image processing portion 16 outputs segmentation data as a result of the determination. Note that, the segmentation processing may be executed based on the result of the above-described original determination processing and monochromatic/color original determination processing.

The original determination data and the segmentation data are stored in the image storage portion 15 in association with corresponding image data (image data after the application of the original image processing). At this time, the original determination data and the segmentation data are coded by the coding/decoding portion 17 and each coded data is thereafter stored in the image storage portion 15 in association with the corresponding image data. Note that, although the coding in storing in the image storage portion 15 is not essential, description will be given assuming that the image data is stored in a state of being coded. This is also the same in operations other than the original reading operation.

<Printing Operation>

By the above-described original reading operation, processing up to filing of the image data of the read original is completed. Next, description will be given for a printing operation when the image data of the read original is printed (that is, when the original is copied). When the user operation to perform processing that requires printing is received by the operation panel 30, the main control portion 18 gives an instruction to the recording portion 12, the image storage portion 15, the image processing portion 16, the coding/decoding portion 17, and the like to execute processing as will be described below. Note that, the main control portion 18 also gives an instruction to the reading portion 13 (original reading instruction), for example, when a copy operation is performed.

The digital multi-functional peripheral 1 is also capable of adding additional information such as a fixed stamp, date (or date and time), and a page number to image data in printing, and when such an adding instruction is given, the main control portion 18 controls the image processing portion 16. It can be said that the additional information added to the image data is an additional image. The additional information is stored in the control memory 19 and is read out as the occasion demands. Of course, the additional information may be originally stored as data of the additional image. In addition, it is recommendable that a plurality of additional information may be stored in the control memory 19 and additional setting information may be stored in the control memory 19. The additional setting information includes at least information showing a position to add to the image data (hereinafter, referred to as an adding position), and when a plurality of additional information is stored, information that indicates any of which is to be selected is also included. Moreover, when an instruction to execute the punching or the stapling by the post processing apparatus is given, the main control portion 18 also controls the post processing apparatus.

The coding/decoding portion 17 reads and decodes image data to be printed and original determination data and segmentation data corresponding thereto from the image storage portion 15, and gives the decoded image data to the image processing portion 16. The image processing portion 16 executes various image processing (hereinafter, referred to as image processing for printing) for the decoded image data (RGB image data). As will be schematically described below, examples of the image processing for printing include image quality adjustment processing, two-color processing, color correction processing, black generation and under color removal processing, spatial filter processing, scaling processing, output tone correction processing, and halftone generation processing. The black generation and under color removal processing, the spatial filter processing, and the halftone generation processing are processing in accordance with various areas indicated by the segmentation data.

As the image quality adjustment processing, a background is detected from the decoded image data to perform background removal. Moreover, as the image quality adjustment processing, RGB adjustment (color adjustment; entire color adjustment of redness or blueness), brightness adjustment, and vividness adjustment are also performed for the image data after the application of the background removal based on setting information set by a user from the operation panel 30. At this time, adjustment in accordance with an original type indicated by the original determination data may be performed.

As the color correction processing, CMY data having components of CMY (C: Cyan, M: Magenta, Y: Yellow) which are complementary colors of RGB is generated from the RGB data after the application of the image quality adjustment processing and the processing of enhancing color reproduction is performed. As the black generation and under color removal processing, black generation processing of generating black (K) data from the CMY data after the application of the color correction and under color removal processing of subtracting the K data obtained by the black generation from the original CMY data to generate new CMY data. As the spatial filter processing, enhancement processing or smoothing processing is performed for CMYK data which is data of the four colors. When a two-color mode for outputting the image data in two colors (for example, red and black) is selected, the two-color processing is performed. As the two-color processing, processing of converting the RGB data into CMY data that represents specified two colors (red and black in this case) is performed. In the case of the two-color mode, the black generation and under color removal processing is executed for the CMY data after the application of the two-color processing and the spatial filter processing is also executed, however, the color correction processing is not performed.

As the scaling processing, image enlarging processing or image reducing processing is performed for the CMYK data after the application of the spatial filter processing based on a printing copy ratio set by the user operation from the operation panel 30. The printing copy ratio is a copy ratio of a printed image for the image indicated by read and stored image data. Of course, the printing copy ratio is not limited to a copy ratio obtained by the user operation and is a copy ratio set as default when no operation is performed for the printing copy ratio. As the output tone correction processing, output γ correction processing of outputting to a recording medium such as recording paper is performed for the CMYK data. As the halftone generation processing, tone reproduction processing of outputting an image by error diffusion processing and dither processing is performed for the CMYK data after the application of the output tone correction processing. In the output tone correction processing and the halftone generation processing, the processing in accordance with an original type indicated by the original determination data may be performed, for example, including differentiating processing contents between a text area and other areas.

The CMYK data after the application of the halftone generation processing is provided to the recording portion 12. Description will be given for the case where additional information is added. There are a method for applying the scaling processing also to the additional information in accordance with a magnification of print data and a method for not applying the scaling processing to the additional information regardless of a magnification of print data. First, when the scaling processing is also performed for the additional information, the main control portion 18 reads the additional information and information showing an adding position, the main control portion 18 or the image processing portion 16 converts into image data as the occasion demands, and the image data of the additional information is provided to the image processing portion 16 before the scaling processing. Note that, the conversion is not necessary when additional image data is originally stored. Subsequently, the image processing portion 16 may synthesize the image data of the additional information and image data of an addition destination that is image data before the scaling processing at the above-described adding position.

When the scaling processing is not performed for the additional information, the main control portion 18 reads the additional information and information showing an adding position, and the main control portion 18 or the image processing portion 16 converts into image data as the occasion demands. In this example, CMYK data is obtained by the conversion. Note that, the conversion is not necessary when additional image data is originally stored. Subsequently, the image processing portion 16 may synthesize the image data of the additional information and image data of an addition destination that is image data after the application of the scaling processing (the above-described CMYK data to which the output tone correction processing or the halftone generation processing is applied) at the above-described adding position.

In either case, it is possible to output CMYK data after the application of the halftone generation processing with the additional information added thereto by the image processing portion 16. Note that, in the digital multi-functional peripheral 1, additional information and an adding position thereof are able to be set by the user using the operation panel 30 while performing a preview display described below.

The recording portion 12 receives the image data to which the image processing for printing has been given by the image processing portion 16 in this manner (CMYK image data in this example) and generates a hard copy (prints out) by an electrophotographic system, an inkjet system, or the like. Then, the post processing apparatus executes the punching or the stapling for printed sheets as the occasion demands. Note that, the data targeted for the printing operation described here is not limited to the image data read by the reading portion 13, and, for example, image data (image file) that has been previously transferred from an external recording medium such as a USB memory, a PC connected through a network, or the like and stored in the image storage portion 15 is also applicable in the same manner. The printing operation for the image data that has been received by facsimile and stored in the image storage portion 15 will be described below.

<Preview Display Operation for Image Data to be Printed>

Next, description will be given for an operation of displaying a preview of image data stored in the image storage portion 15 as a result of original reading on the touch panel 32 before printing (preview display operation). The digital multi-functional peripheral 1 is configured so as to allow image data that is an object for printing to be displayed for previewing (thumbnail display). The preview display operation is basically performed when a user operation to perform a preview display is received by the operation panel 30. For example, at the time when copy conditions are set and a start key is depressed after a setting of performing a preview display, original reading is started, and after the reading, the preview image may be displayed on the touch panel 32. Alternatively, the operation is also performed by a forcible preview display control as will be described below that is a main characteristic of the present invention.

The main control portion 18 gives an instruction to the image storage portion 15, the image processing portion 16, the coding/decoding portion 17, the panel control portion 11, and the like to execute processing as will be described below. Note that, the main control portion 18 also gives an instruction to the reading portion 13 (original reading instruction), for example, when an operation of copying an original is performed.

The coding/decoding portion 17 reads and decodes image data to be displayed for previewing and original determination data and segmentation data corresponding thereto from the image storage portion 15, and gives the decoded data to the image processing portion 16. The image processing portion 16 executes various image processing (hereinafter, referred to as image processing for previewing) for the decoded image data (RGB image data). As will be schematically described below, examples of the image processing for previewing include image quality adjustment processing, two-color processing, color correction processing, spatial filter processing, scaling processing, and output tone correction processing. The spatial filter processing and the output tone correction processing are processing in accordance with various areas indicated by the segmentation data.

The image quality adjustment processing here is the same as the image quality adjustment processing in the image processing for printing. As the color correction processing, processing of converting the image data after the application of the image quality adjustment processing (RGB data) into R'G'B' data based on display characteristics of the touch panel 32. As the spatial filter processing, enhancement processing or smoothing processing is performed for the R'G'B' data.

As the scaling processing, image enlarging processing/image reducing processing in accordance with a print magnification is performed for R'G'B' data after the application of the spatial filter processing, and further processing for converting the number of pixels of the R'G'B' data into the number of pixels (display resolution) of the touch panel 32 is performed and the image enlarging processing or image reducing processing is performed based on a preview display magnification at the same time. Note that, the preview display magnification is a magnification, for example, such as twice or four times, and is a magnification of an image in the preview display.

A preview image generating portion 16a provided in the image processing portion 16 generates an image for the preview display (preview image) mainly by such scaling processing for the preview display.

Description will be given for a preview image when additional information is added. As described above, the digital multi-functional peripheral 1 is capable of outputting image data to be output with additional information added thereto, and the preview display is executed when the panel control portion 11 performs control to display an image showing the additional information. Thus, the preview image generating portion 16a generates such an image showing the additional information and synthesizes it and the preview image generated from the image data to be output to generate a preview image with the additional information. The panel control portion 11 causes the touch panel 32 to display the preview image.

The additional information is able to be output with image data to be printed by performing the scaling processing in accordance with a print magnification, or is also able to be output in a state of being added to image data to be printed, to which the scaling processing in accordance with a print magnification has been given. First, when the scaling processing is also performed for the additional information to output, the main control portion 18 reads the additional information and an adding position thereof and provides to the image processing portion 16 before the scaling processing. Subsequently, the preview image generating portion 16a generates R'G'B' data of an image showing the additional information to synthesize with image data of an addition destination that is image data before the scaling processing at the above-described adding position. Then, the image enlarging processing/image reducing processing in accordance with a print magnification may be applied to the R'G'B' data to which the image of the additional information has been added.

When the scaling processing is not performed for the additional information, the main control portion 18 reads the additional information and an adding position thereof and provides to the image processing portion 16. Subsequently, the preview image generating portion 16a generates R'G'B' data of an image showing the additional information from the additional information to synthesize with R'G'B' data after the application of the image enlarging processing/image reducing processing in accordance with a print magnification at the above-described adding position, and performs processing for converting the number of pixels of the R'G'B' data after the addition into the number of pixels (display resolution) of the touch panel 32 and the image enlarging processing or image reducing processing based on a preview display magnification at the same time.

Moreover, when the punching or the stapling is applied by the post processing apparatus, image data for post processing such as punch or staple may be output by synthesizing it and a preview image generated from image data to be printed (and data of the image showing the additional information) at a punching position or a stapling position. Alternatively, separately from a preview image generated from image data to be printed (and data of the image showing the additional information), image data for post processing such as punch or staple may be output to be aligned in adjacent thereto. In the latter case, since the synthesizing processing is not required, the processing time becomes shorter. Either method is capable of displaying a finish state of paper on which an image is to be formed in the preview display of image data.

As the output tone correction processing, output γ correction processing for displaying image data on the touch panel 32 is performed for the R'G'B' data of the preview image or the preview image and the R'G'B' data of the image for post processing. In the output tone correction processing, processing in accordance with an original type indicated by the original determination data may be performed, for example, including differentiating processing contents between a text area and other areas.

The two-color processing is executed only when a two-color mode for outputting image data in two colors of red and black, for example, is selected. As the two-color processing, processing of converting the RGB data after the application of the image quality adjustment processing into CMY data that represents specified two colors (red and black in this case) is performed. The generated CMYK data is converted into R'G'B' data based on display characteristics of the touch panel 32 at the subsequent color correction processing.

R'G'B' data generated by the preview image generating portion 16a and dealt with by means of the output tone correction processing is given to the touch panel 32. The panel control portion 11 performs control for the touch panel 32 to display an image corresponding to the R'G'B' data in a state of being incorporated in a GUI image and displays the GUI image on the touch panel 32. The user confirms the image displayed for previewing that includes an image showing additional information, and determines whether to execute printing as it is or to cancel, whether to delete the additional information, and whether to execute changing of the adding position (or changing of the additional information), and is able to perform an operation corresponding thereto.

<Supplementary on Original Reading/Preview Display/Printing>

Although the preview display operation is explained separately from the printing operation, first, image data after the application of the output tone correction processing (CMYK data) as the printing operation may be converted into R'G'B' data based on display characteristics of the touch panel 32, and may be displayed on the touch panel 32 in a state of being incorporated in the GUI image after performing the conversion processing corresponding to the pixel number (display resolution) of the touch panel 32 and the scaling processing in displaying a preview. It is useful for a case where a setting is made such that the preview display is previously performed when the copying operation is performed since the printing operation is completed to a certain degree and the printing operation after the preview display can thereby be quickly completed, for example.

In addition, an example in which the coded image data, the original classification data and the segmentation data are stored in the image storage portion 15 in association with one another has been taken as the original reading operation, and the printing operation and the preview display operation have been also described based on the example. As an alternative method thereof, coding may be performed only for the image data read by the reading portion 13, and the coded image data may be temporarily stored in the image storage portion 15. In this case, it may be configured such that the image processing portion 16 applies the original type determination processing and the segmentation processing to the image data that has been read from the image storage portion 15 and decoded by the coding/decoding portion 17 in the printing operation and the preview display operation. In addition, such an alternative method is also applicable in sending image data such as facsimile sending or internet FAX sending, which will be described below.

<Supplement for Filing Operation>

As described as the original reading operation, the filing operation is an operation of storing read image data (which is coded as the occasion demands) in the image storage portion 15 provided inside the digital multi-functional peripheral 1. In filing, it is also possible to store (file) image data to be stored after adding additional information thereto. The preview display operation for the image data to be filed in the image storage portion 15 is basically as described in the image data to be printed.

<Printing Operation for Image Data Received by Facsimile>

Next, description will be given for the printing operation for image data received by facsimile communication. When detecting a facsimile communication request by the modem 24, the main control portion 18 gives an instruction to the recording portion 12, the image storage portion 15, the image processing portion 16, the NCU 23, the modem 24, and the like to execute processing as will be described below.

First, the modem 24 and the NCU 23 sequentially receive image data (compressed image data) sent from a sending source according to the communication procedure and expand the received compressed image data, and execute rotating processing (processing of rotating a sending direction), resolution conversion processing, and the like as necessary to provide to the image processing portion 16 at the same time.

Since the image data received by facsimile communication is black-and-white binary data, particular processing is not performed for the image data (K data) to which processing such as expansion has been given in the image processing portion 16, and the image data is directly given to the recording portion 12. The recording portion 12 receives the image data and executes printing by an electrophotographic system, an inkjet system, or the like. It is also possible to perform printing for the image data received by facsimile communication after adding the above-described additional information thereto.

Description has been given for the facsimile reception of the monochromatic image, but when a color facsimile image (RGB data) is received, the image processing portion 16 may execute the image processing for facsimile reception described here for the RGB data.

<Preview Display Operation of Image Data Received by Facsimile>

Description will be given briefly for the preview display operation of image data received by facsimile communication based on the printing operation of the same image data. The preview display operation is performed when a previous setting or a user operation is made such that printing is executed after the received image data is previously confirmed. In the preview display operation, the image processing portion 16 combines, in the case of adding additional information, image data of the additional information with image data after the application of the expansion processing or the like, and then, further performs the conversion processing in accordance with a pixel number (display resolution) of the touch panel 32, and the scaling processing in displaying a preview. The image data after the application of the scaling processing is displayed on the touch panel 32 in a state of being incorporated in the GUI image. The user confirms the image displayed for previewing, determines whether to execute or discard printing, and is able to perform printing or discarding operation.

<Facsimile Sending Operation>

Next, description will be given for a sending operation when image data of a read original is sent by facsimile. The facsimile image data is sent to destination (sending destination) information set by the user operation from the touch panel 32 or the key operation portion 31. The destination information (telephone number in this example) is stored in the control memory 19 and is read out as necessary. The destination information is generally stored as address book data so that information of each of a plurality of destinations is viewable and selectable, or is directly input before sending.

When the user operation to execute the facsimile sending is received by the operation panel 30, the main control portion 18 gives an instruction to the image storage portion 15, the image processing portion 16, the coding/decoding portion 17, the NCU 23, the modem 24, and the like to execute processing as will be described below. Note that, the main control portion 18 also gives an instruction to the reading portion 13 (original reading instruction), for example, when the operation to send the original by facsimile is performed. Note that, it is also possible for the main control portion 18 to select image data to be sent and start to send it by facsimile as it displays a preview of the image data stored in the image storage portion 15.

The coding/decoding portion 17 reads and decodes image data to be printed and original determination data and segmentation data corresponding thereto from the image storage portion 15 and gives the coded data to the image processing portion 16. The image processing portion 16 executes various image processing (hereinafter, referred to as image processing for facsimile sending) for the decoded image data (RGB image data). As will be schematically described below, examples of the image processing for facsimile sending include image quality adjustment processing, spatial filter processing, scaling processing, output tone correction processing, and halftone generation processing. The spatial filter processing and the halftone generation processing may be processing in accordance with various areas indicated by the segmentation data, while it is possible not to use the segmentation data. Further, in the original reading operation following the facsimile sending, the segmentation processing for the read image data and coding and storage of the segmentation data may not be executed.

As the image quality adjustment processing, the decoded image data is converted into K data using a matrix coefficient. In this case, a matrix coefficient in accordance with an original type indicated by the original determination data may be used. As the spatial filter processing, enhancement processing or smoothing processing is performed for the K data. As the scaling processing, image enlarging processing or image reducing processing in accordance with a sending resolution set by the operation panel 30 or a default-set sending resolution is performed for the K data after the application of the spatial filter processing. As the output tone correction processing, output γ correction processing for the purpose of outputting to a recording medium such as recording paper at a sending destination, for example, is performed to the K data after the application of the scaling processing. Actually, it is possible to perform output γ correction to a general device but not output γ correction that takes a device of the sending destination into consideration. As the halftone generation processing, binarization by error diffusion processing, for example, is performed for the K data after the application of the output tone correction processing. In the output tone correction processing and the halftone generation processing, processing in accordance with an original type indicated by the original determination data may be performed.

Description has been given for the facsimile sending of the monochromatic image, but when a color image is sent by facsimile, the image processing portion 16 may perform processing of converting the decoded image data into L*a*b* data for color transmission using a matrix coefficient as the image quality adjustment processing in the above-described image processing for facsimile sending so that the subsequent processing is performed for the L*a*b* data.

The rotating processing is applied to the image data after the application of the halftone generation processing as the occasion demands and the image data after the application of the halftone generation processing is compressed and coded by the coding/decoding portion 17 in a compression format at the facsimile sending, and then temporarily saved in the image storage portion 15. The modem 24 performs sending procedure to a sending destination set through the NCU 23, and at the time when communication with the sending destination is established (at the time ready for sending), the coded K data which is temporarily saved is read out and sequentially sent to the sending destination through the public line network after the application of necessary processing such as changing of the compression format.

In addition, the digital multi-functional peripheral 1 is also capable of sending image data to be sent with additional information added thereto. When sending image data to the outside like in this example, it is also possible to add sending source information (transmission source information) in addition to a stamp, date (date and time), and a page number as the additional information. In this case, the sending source information that is added in sending image data may include any one or more pieces of information of a name of a sender, information of a telephone number of a sending source, and information of an electronic mail address of a sending source. Moreover, information of a sending destination (information of a destination) and the like may be added as the additional information in sending image data.

In the case of the facsimile sending with additional information added, synthesizing processing may be performed as follows. The main control portion 18 reads additional information and information showing an adding position, the main control portion 18 or the image processing portion 16 converts the information into image data, and the image processing portion 16 synthesizes the converted image data (image data of additional information) and image data of an addition destination that is image data after the application of the scaling processing at the above-described adding position. In the digital multi-functional peripheral 1, the position at which the image data of the additional information is added is possibly set by a user from the operation panel 30 as the user performs the preview display as will be described below. The synthesized image data is sent to the sending destination after the above-described output tone correction processing, rotating processing, and compression processing, etc., are applied to it.

<Preview Display Operation for Image Data to be Sent by Facsimile>

The digital multi-functional peripheral 1 is configured so as to be possible to display image data to be sent by facsimile sending or the like for previewing. The preview display operation is performed, for example, when the previous setting or the user operation to execute sending after the confirmation of the image data before sending in advance is performed. Description will be given for the preview display operation for the image data to be sent by facsimile based on the facsimile sending operation for the same image data. In the preview display operation, the main control portion 18 also gives an instruction to the panel control portion 11.

In the preview display operation, the image processing portion 16 performs the same processing as in the facsimile sending up to the image quality adjustment processing, the spatial filtering processing (and scaling processing), executes preview image generation processing by the preview image generating portion 16a and may perform, the output γ correction processing to display image data as the output tone correction processing. As the preview image generation processing, the preview image generating portion 16a generates the data of the preview image by performing the conversion processing in accordance with a pixel number (display resolution) of the touch panel 32 and the scaling processing in accordance with a reducing/enlarging ratio in displaying a preview (preview display magnification) to the image data after the application of the image enlarging processing/image reducing processing in accordance with a sending resolution. Note that, in the preview display operation, the spatial filter processing may not be executed and the halftone generation processing is not executed.

R'G'B' data generated by the preview image generating portion 16a and dealt with by means of the output tone correction processing is given to the touch panel 32. The panel control portion 11 performs control for the touch panel 32 to display an image corresponding to the R'G'B' data in a state of being incorporated in a GUI image and displays the GUI image on the touch panel 32.

Description will be given for a preview image that is sent with additional information added thereto. The additional information is output by being added to image data after the application of the scaling processing in accordance with a sending resolution. More specifically, the main control portion 18 reads the additional information and an adding position thereof and gives the information and the position to the image processing portion 16. Subsequently, the preview image generating portion 16a generates R'G'B' data of an image showing the additional information from the additional information and synthesizes it and R'G'B' data after the application of the image enlarging processing/image reducing processing in accordance with a sending resolution at the above-described adding position. Then, processing for converting the number of pixels of the R'G'B' data after the addition into the number of pixels (display resolution) of the touch panel 32 is performed and the image enlarging processing or image reducing processing is performed based on a preview display magnification at the same time.

The image data combined with the additional information image in this manner is incorporated in a GUI image and displayed on the touch panel 32 after the application of the output tone correction processing (output γ correction processing to display image data) in the above-described preview display. The user confirms the image displayed for previewing including the additional information image, determines whether to execute the facsimile sending as it is or to cancel, whether to delete the additional information, whether to execute changing of the adding position (or changing of the additional information), or the like, and is able to perform an operation corresponding thereto.

<Sending Operation for Image Data Via Internet>

Next, description will be given for a sending operation when image data of a read original is sent by an electronic mail or internet FAX via the internet. Such image data to be sent via the internet is also sent to sending destination information (electronic mail address in this example) set by the user operation from the touch panel 32 or the key operation portion 31 and stored in the control memory 19.

When the user operation concerning the sending via the internet is received by the operation panel 30, the main control portion 18 gives an instruction to the format converting portion 14, the image storage portion 15, the image processing portion 16, the coding/decoding portion 17, the LAN control portion 21, and the like to execute sending processing via the internet as will be described below. Note that, the main control portion 18 also gives an instruction to the reading portion 13 (original reading instruction), for example, when an operation to send an original via the internet is performed.

The coding/decoding portion 17 reads and decodes image data to be printed and original determination data and segmentation data corresponding thereto from the image storage portion 15, and gives the decoded data to the image processing portion 16. The image processing portion 16 executes various image processing (hereinafter, referred to as image processing for internet sending) to the decoded image data (RGB image data). Examples of the image processing for internet sending include the image quality adjustment processing, the spatial filter processing, the scaling processing, the output tone correction processing, and the halftone generation processing, which have been described in the image processing for facsimile sending.

Moreover, the image processing in the case of color image sending is also the same as the image processing for facsimile sending, and in the image processing for internet sending, the image processing portion 16 may perform processing of converting the decoded image data into L*a*b* data for color transmission using a matrix coefficient as the image quality adjustment processing so that the subsequent processing is performed for the L*a*b* data.

The coding/decoding portion 17 codes (compresses) the image data after the application of the image processing for internet sending to obtain compressed files. The compression is performed in the unit of a single page of the original. Subsequently, the format converting portion 14 converts the compressed files into a single file and the file is attached to a multipart mail according to MIME (Multipurpose Internet Mail Extension), for example. By the processing so far, the read image data is converted into a format of an electronic mail. The electronic mail is sent to a sending destination via the internet using a mail transfer protocol such as an SMTP (Simple Mail Transfer Protocol) through a LAN interface by the LAN control portion 21.

In the case of the internet facsimile sending, the coding/decoding portion 17 may perform the compression in a compression format only for facsimile such as MH, for example, and the format converting portion 14 may convert the obtained compressed files in the unit of a page, for example, into a single TIFF file. In the case of sending just by attaching to the electronic mail as an attached file (in the case of sending by so-called scan to e-mail), the coding/decoding portion 17 may perform the compression in a compression format such as JPEG, for example, and the format converting portion 14 may convert the obtained compressed files in the unit of a page into a single PDF file, for example.

In addition, even when image data to be sent is image data sent via the internet, the digital multi-functional peripheral is capable of sending the image data with additional information added thereto in the same manner as the case of the facsimile sending image data. As the additional information adding processing, the synthesizing processing described in the facsimile sending may be executed, and the image data is subjected to the output tone correction processing, the compression processing, the format conversion processing, and the like described above and thereafter sent to an address of a sending destination as an electronic mail.

<Preview Display Operation for Image Data to be Sent Via Internet>

As mentioned in the description for the preview display in the facsimile sending, the digital multi-functional peripheral 1 of the present invention is capable of being configured so that a preview of image data to be sent via the internet is also able to be displayed on the touch panel 32.

In the preview display operation, as mentioned in the description for the preview display in the facsimile sending, the image processing portion 16 performs the same processing as the image processing for the internet sending up to the image quality adjustment processing, the spatial filter processing (and the scaling processing), executes the preview image generation processing by the preview image generating portion 16a and may perform, as the output tone correction processing, the output γ correction processing to display image data. R'G'B' data generated by the preview image generating portion 16a and dealt with by means of the output tone correction processing is given to the touch panel 32, is incorporated by in a GUI image the panel control portion 11 and is displayed on the touch panel 32. Further, a preview display in which an image showing additional information is added is also possible to be described by using the description for the preview display in the facsimile sending.

<Description of Preview Display Before Sending Image Data According to the Present Invention>

As has been described the preview display operation before sending in sending data by a facsimile or the like, the digital multi-functional peripheral 1 according to the present invention has the preview image generating portion 16a that reads image data to be sent from the image storage portion 15 and generates a preview image thereof.

The image data to be sent may be image data input from any of a scanner apparatus illustrated as the reading portion 13, an attachable/detachable storage apparatus illustrated as the USB memory connected to the USB I/F 25, and a communication line illustrated as the LAN or the line. Alternatively, the image data to be sent may be image data read from a storage apparatus illustrated as the image storage portion 15 provided in the digital multi-functional peripheral 1. Of course, the digital multi-functional peripheral 1 according to the present invention has a sending portion that sends image data to be sent.

The sending portion is illustrated as a main control portion 18 with a modem 24 and an NCU 23, or the like, alternatively with a LAN control portion 21, or the like. Furthermore, as the sending portion, the main control portion 18 sending (that is, filing) the image data read by the reading portion 13 to the image storage portion 15 for storing is included. That is, as a sending destination, a storage portion inside an own device such as the image storage portion 15 is able to be included, and a storage portion outside the own device is also able to be included.

The preview image firstly generated by the preview image generating portion 16a to be firstly displayed, is an enlarged/reduced image based on a predetermined preview display magnification, and a reduced image is preferable. The preview image generated by the preview image generating portion 16a is sent to the touch panel 32 by the control of the main control portion 18, is controlled by the panel control portion 11 to be displayed in a state of being incorporated in a GUI image, and is displayed on the touch panel 32.

In this manner, the panel control portion 11 is an example of a display control portion for performing a control to display the generated preview image on the display portion, and the touch panel 32 is an example of the display portion for displaying a preview image of the image data to be sent.

As has been described above, the digital multi-functional peripheral 1 is configured to be capable of outputting image data that is the object of the output with additional information added thereto. Furthermore, the panel control portion 11 performs control based on the control of the main control portion 18 to display an additional information image on the touch panel 32. Therefore, the preview image generating portion 16a generates such an additional information image like this and generates a preview image with the additional information added thereto by combining the image with the additional information with a preview image generated from image data that is the object of the output. Note that, in a preview display, description is given on the assumption that an image itself showing additional information is combined at an adding position and displayed, however, it may be configured such that an existence image showing that additional information exists is displayed instead of the additional information.

The panel control portion 11 performs control for the touch panel 32 to display the generated preview image in a state of being incorporated in a GUI image and displays the GUI image on the touch panel 32. In this way, the digital multi-functional peripheral 1 is preferably configured such that the display control portion performs control for the display portion to display additional information in displaying a preview. It is thereby possible to confirm a preview image that is closer to an output form.

The digital multi-functional peripheral 1 according to the present invention is, as a main characteristic, provided with a setting storage portion for storing setting information related to a preview display by the display control portion for each sending destination (destinations). Here, the setting information is assumed to include forcible execution information showing whether or not a preview image is forcibly displayed by the display control portion. The setting storage portion can be illustrated as the control memory 19 of FIG. 2 and the setting information can be illustrated as the preview setting table 19a.

Note that, in the example hereinafter, although description will be given assuming that the preview setting table 19a is a table different from the address book table 19b, and the preview setting table 19a is stored associating with the address book table 19b, the preview setting table 19a may be stored so as to be incorporated into the address book table 19b.

In the digital multi-functional peripheral 1 according to the present invention, as a main characteristic, the display control portion performs display control based on the setting information including the forcible execution information stored in the setting storage portion. The setting information is set for each sending destination as described above, therefore, display control on the display control portion is different for each sending destination. Especially, whether or not the forcible preview display is executed can be differentiated for each sending destination. In addition, a setting of setting information is usually made by an administrator.

In the present invention, with a configuration described above, information (including forcible execution information showing presence/absence of a forcible preview display) on a preview display can be set differently for each sending destination. In other words, the security level is able to be changed in accordance with a sending destination. For example, for a client, the confirmation is made by a preview display before sending without fail, and for a contractor or a filing destination of a user's own to which an immediate reperformance is possible in the case of making a mistake, it is possible to set such a forcible preview display is not to be performed.

In this manner, according to the present invention, prevention of an erroneous sending effectively is possible by using a preview display without causing a user to feel troublesome with an unnecessary confirmation operation. That is, effective performance of confirmation by a preview display on preventing an erroneous sending becomes possible, and the erroneous sending is able to be controlled on a side of an apparatus (that is, a side of an administrator). Furthermore, once a setting of a preview is made for each sending destination, for a user too, the setting of the preview is not needed to be made every time when sending is made.

<Specific Example of Preview Display>

Referring to FIGS. 4 to 13, description will hereinafter be given specifically for an example of a system setting to enable a display of a preview image of image date to be sent for each sending destination, and an example of a preview display.

Figure 4:
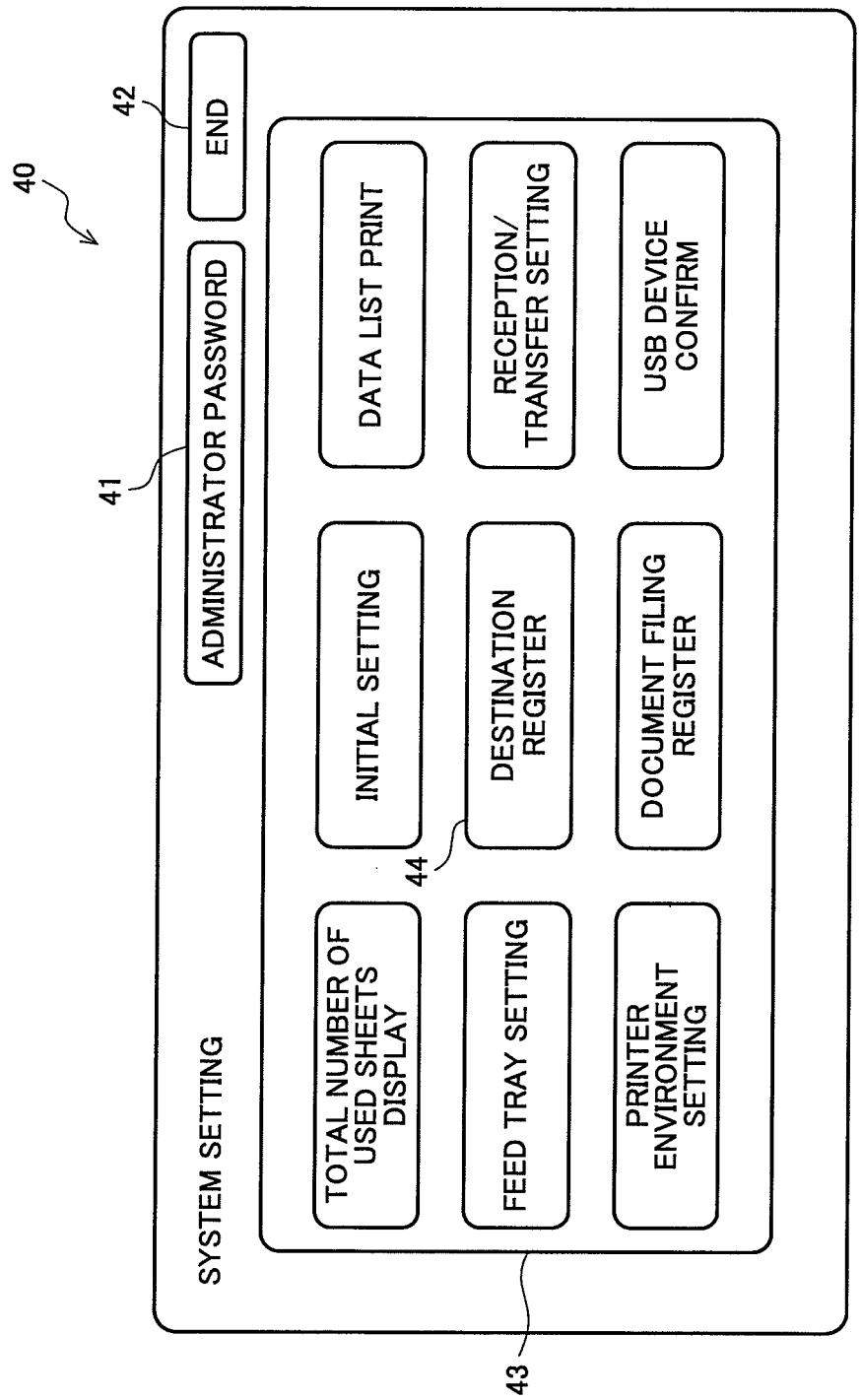
FIG. 4 is a diagram for showing an example of a system setting screen of the digital multi-functional peripheral explained in FIGS. 2 and 3.

First, description will be given for a system setting mainly performed by an administrator of the digital multi-functional peripheral 1 with reference to FIGS. 4 to 8. FIG. 4 is an example of a system setting screen in the digital multi-functional peripheral explained in FIGS. 2 and 3.

The GUI image 40 shown in FIG. 4 is displayed as a system setting screen on the touch panel 32 when a system setting key 31h in the operation panel 30 of FIG. 3 is depressed. In the GUI image 40, an administrator password key 41 and an end key 42 are displayed so as to be selectable by a user. By selecting the administrator password key 41 and inputting a correct password in the subsequent password input screen, each keys in a setting column 43 is selectable. Description will hereafter be given on the assumption that the correct password has been already input. In addition, as the end key 42 is selected to return to a screen that be originally displayed from the system setting screen.

Figure 5:
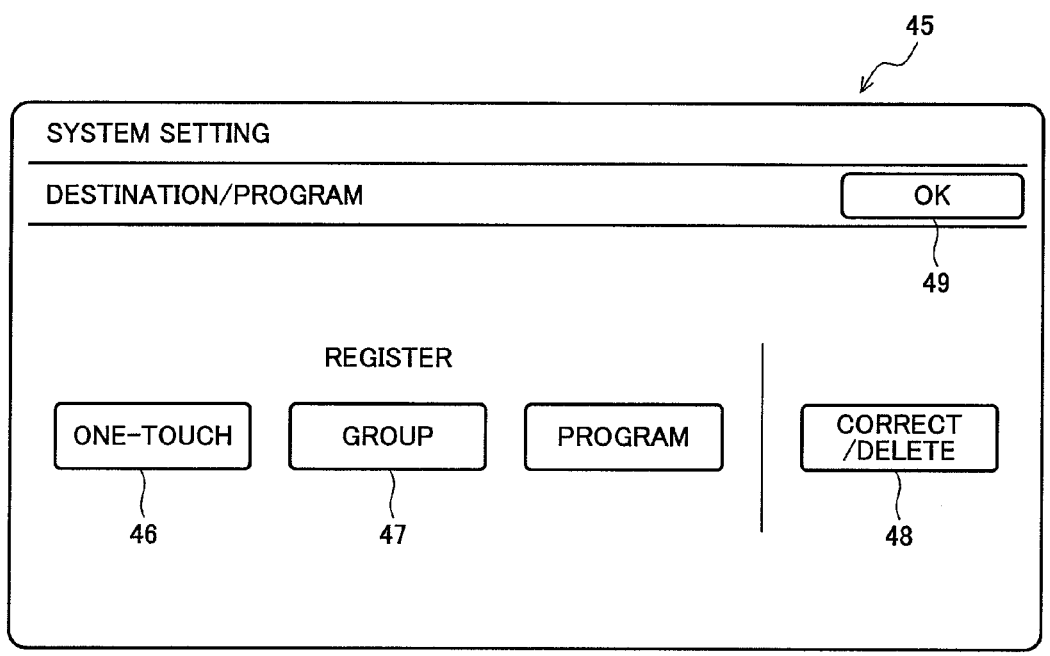
FIG. 5 is a diagram for showing an example of a GUI image displayed when a destination register key is selected in the system setting screen of FIG. 4.

In the setting column 43 of the GUI image 40, various setting keys including a destination register key 44, a total number of used sheets display key and the like are displayed so as to be selectable by a user (an administrative user, hereinafter similar). When the destination register key 44 is selected, the GUI image 45 shown in FIG. 5 is displayed on the touch panel 32. FIG. 5 is a diagram showing an example of a GUI image displayed when the destination register key is selected on the system setting screen of FIG. 4.

In the GUI image 45, a one-touch register key 46 for proceeding to a screen for performing a one-touch register with which sending is able to be made easily by one-touch, a group register key 47 for proceeding to a screen for registering destinations (sending destinations) in a group, a correct/delete key 48 to proceed to a screen for correcting or deleting the registered contents, an OK key 49 for returning to a previous screen, and the like are displayed so as to be selectable by a user.

Figure 6:
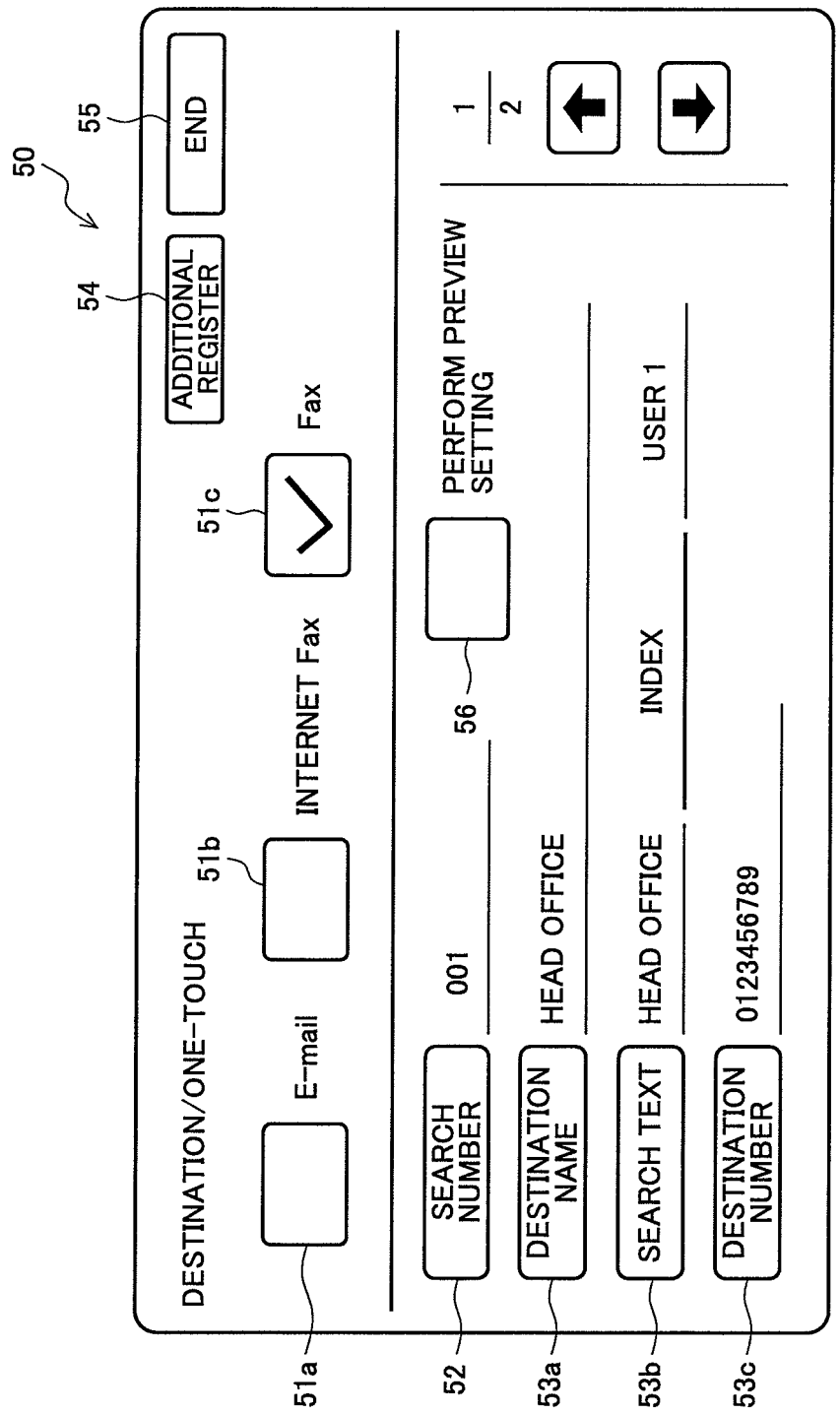
FIG. 6 is a diagram for showing an example of a GUI image displayed when a one-touch register key is selected in the GUI image of FIG. 5.

When the one-touch register key 46 is selected in the GUI image 45, the GUI image 50 shown in FIG. 6 is displayed on the touch panel 32. FIG. 6 is a diagram showing an example of a GUI image displayed when the one-touch register key is selected in the GUI image of FIG. 5.

In the GUI image 50, types of destinations such as an E-mail 51a, an internet FAX 51b and a FAX 51c are displayed so as to be selectable by a user. Here, an example in which the FAX 51c is selected is shown. Then in the GUI image 50, a search number setting key 52 for inputting a search number of a selected destination type, a destination name setting key 53a for inputting a name of a destination, a search text setting key 53b for inputting a search text that is to be a key for searching a destination, a destination number setting key 53c for inputting a destination number (herein, a FAX number) and the like are displayed so as to be selectable by a user. By selecting these keys and causing a software keyboard to be displayed on each screen, or the like, an input setting of the destination and the like becomes possible.

Furthermore, in the GUI image 50, a preview setting key 56 for displaying a screen on which setting of presence/absence, etc., of a preview of the destination (sending destination) is displayed so as to be selectable by a user. When the preview setting key 56 is selected, the GUI image 60 shown in FIG. 7 is to be displayed on the touch panel 32.

Figure 7:
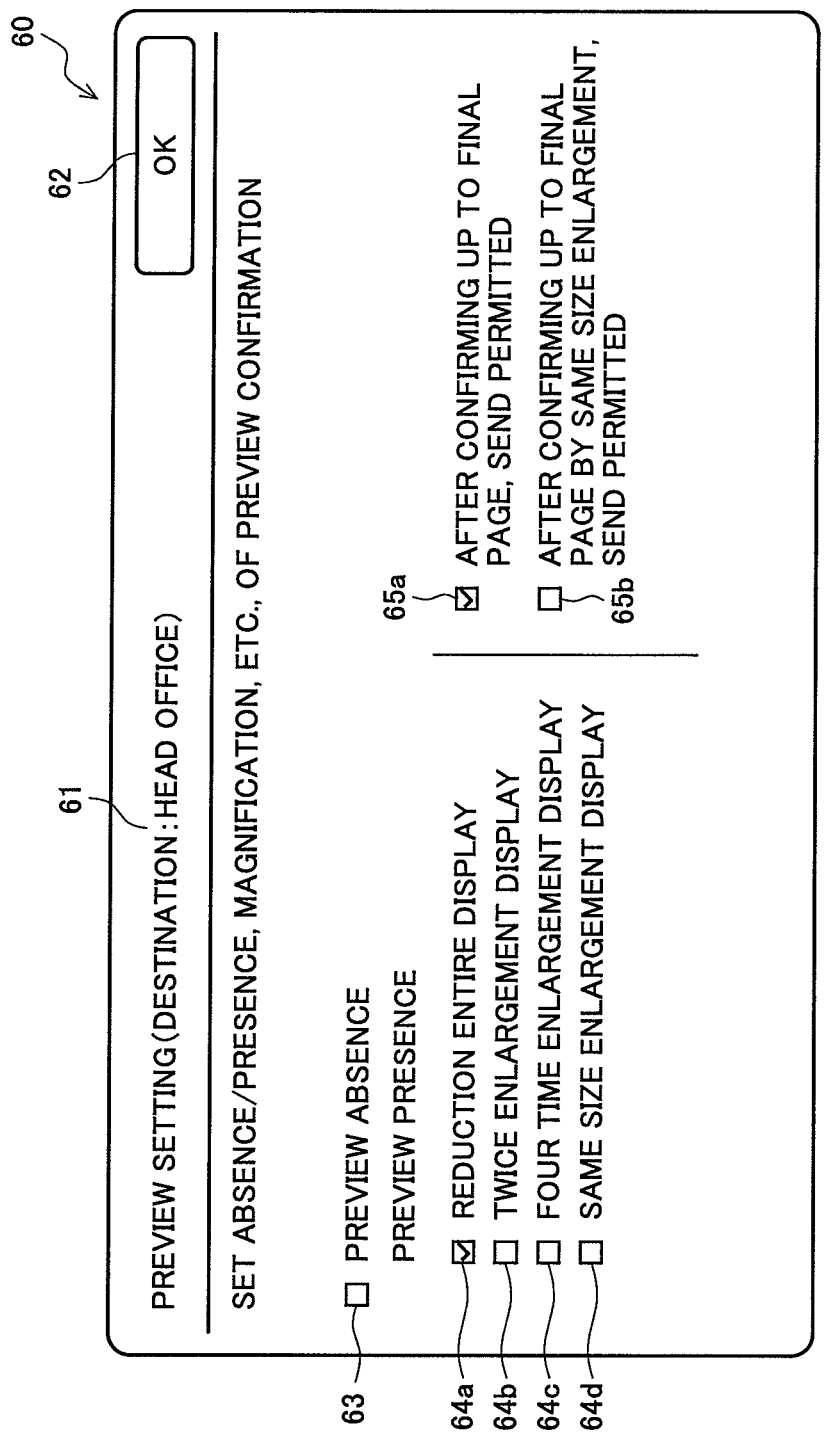
FIG. 7 is a diagram for showing an example of a GUI image displayed when a preview setting key is selected in the GUI image of FIG. 6.
Figures 8, 9:
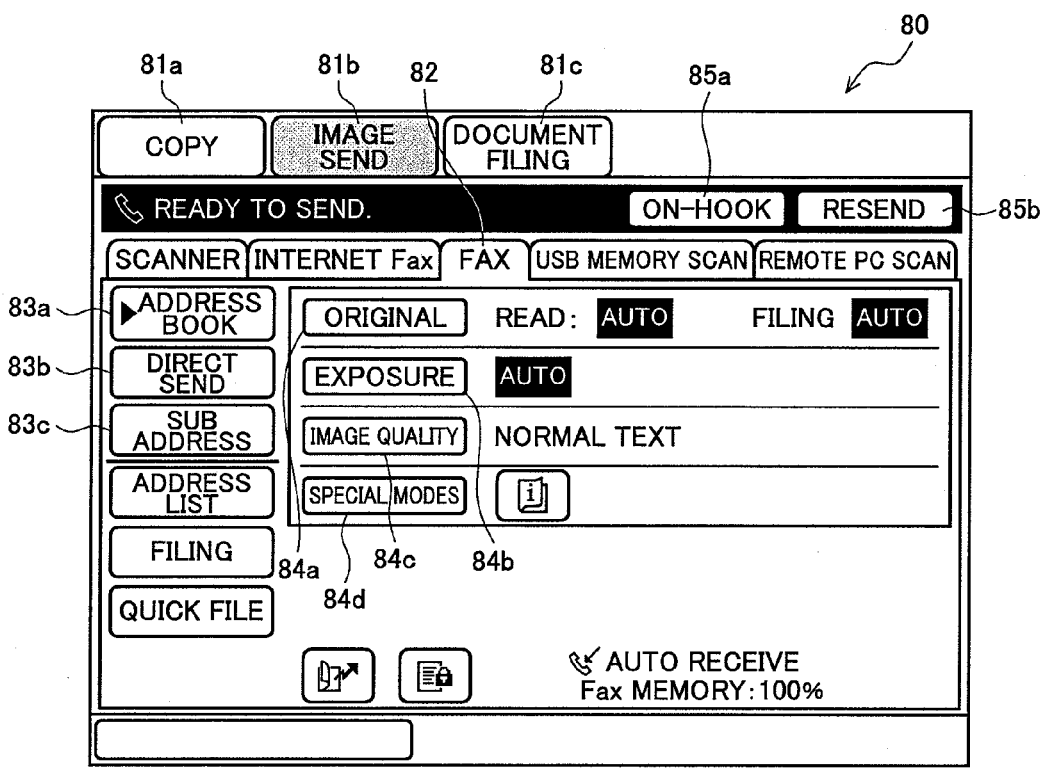
FIG. 8 is a diagram for showing an example of a preview setting table which is generated as a result of performing the preview setting for each sending destination in the GUI image of FIG. 7.
FIG. 9 is a diagram for showing an example of a standard screen in an image send mode of the digital multi-functional peripheral explained in FIGS. 2 and 3.

FIG. 7 is a diagram showing an example of a GUI image displayed when the preview setting key is selected in the GUI image of FIG. 6, and FIG. 8 is a diagram showing an example of a preview setting table generated as a result of performing the preview setting for each sending destination in the GUI image of FIG. 7.

In the GUI image 60 shown in FIG. 7, as well as a current destination name 61 is displayed, an OK key 62 is displayed so as to be selectable by a user. Additionally, in the GUI image 60, a preview absence selecting column 63 for making a setting to be not executing a forcible preview display, a preview presence selecting column for making a setting to be executing, a sending permission conditions setting column for setting that in what way of a preview display a confirmation is made, a sending permission is given, are displayed so as to be selectable by a user.

By selecting the OK key 62 by the administrative user, the preview setting by selecting each column is able to be registered and recorded associating with the current destination (name 61, or a destination corresponding thereto) in the preview setting table 19a in the control memory 19.

For the preview presence selecting column, a reduction entire display column 64a for making a setting of a preview to be reduced and displayed entirely, twice enlargement display column 64b for making a setting of the one displayed entirely to be a display in twice enlargement, four time enlargement display column 64c for setting the one displayed entirely to be a display in four time enlargement, and same size enlargement display column 64d for setting that performs a display in enlargement such as the one displayed entirely is returned to be in original size (a display of the image data to be sent as it is) are displayed so as to be selectable by a user.

The administrative user selects any one of the columns (check boxes) 64a to 64d and put a check in it, and by selecting the OK key 62, register in the preview setting table 19a (setting information) is performed so that a display magnification value of the destination becomes the setting of the selected side of the column. In FIG. 8, an example of being registered in the preview setting table 19a is shown such that the preview is to be a "reduction entire display" for the destination "head office" according to the setting in the GUI image 60.

In this manner, when the forcible execution information is the information showing to display a preview image forcibly, the setting information preferably includes the display magnification value in displaying a preview image by the display control portion. Thereby, the setting of the preview display method is able to be changed for each sending destination (destination).

For example, for a destination to which a display in enlargement is desired, when the setting thereof is made previously, the setting of display in enlargement needs not to be made for the preview displayed in reduction entirely in a preview in sending. In fact, there is a case where a point (a confirmation point which is important) that should not be mistaken is different in accordance with a sending destination (a destination), however, according to the above-described configuration, while also corresponding to that, the erroneous sending is able to be prevented effectively.

To cite a more specific example, when a sending destination is a very important client, before sending an original, the sending original is confirmed by displaying a preview without fail and when confirming, one displayed in reduction is displayed in enlargement and the contents thereof is able to be confirmed entirely up to the final page. Contrary to this, in a case of an ordinary client, confirmation of an entire image by a display in reduction is only performed, and when a sending destination is the one that does not need to be especially conscious of, it is possible that a forcible preview display is not to be executed. In this manner, for a destination where confirmation is not needed, sending is able to be performed without a preview display, and even when the confirmation is needed, for a destination where only a display in reduction is needed, the display in reduction is performed, and for an important destination, a display in enlargement is performed and operational error is able to be reduced effectively.

As the sending permission conditions setting columns in the GUI image 60, a final page confirm column 65a for making a setting to be "after confirming up to the final page (all pages), sending is permitted", a same size confirm column 65b for making a setting to be "after performing same size enlargement and confirming up to the final page (all pages), sending is permitted", are displayed so as to be selectable by a user.

The administrative user selects any one of the columns (check boxes) 65a and 65b and put a check in it, and by selecting the OK key 62, register in the preview setting table 19a (setting information) is performed so that permission information of the destination becomes the setting of the selected side of the column. On the other hand, when the administrative user selects the OK key 62 without putting a check in any of the columns 65*a* and 65*b*, it is so registered on the preview setting table 19*a* that the permission information of the destination is set to be without conditions for sending permission. In FIG. 8, an example of being registered on the preview setting table 19*a* is shown such that the permission information (sending permission conditions) for the destination "head office" is the "confirmation up to the final page" according to the setting in the GUI image 60.

Note that, the columns 65*a* and 65*b* may be made to be selectable when basically any one of the columns 64*a* to 64*b* is selected (that is, when displaying a preview forcibly). Alternatively, independent of the selection of the columns 64*a* to 64*d*, the columns 65*a* and 65*b* are made to be selectable, and in a state where any of the columns 64*a* to 64*d* is not selected, it is possible to handle assuming a forcible preview display by a magnification is selected automatically.

In this way, the setting storage portion illustrated as the control memory 19, preferably stores the permission information which shows whether sending of the image data is permitted only after a preview image for all pages of the image data to be sent is displayed, or whether sending of the image data is permitted independent of the display of the preview image as a part of the above setting information. The permission information may be stored in association with the forcible execution information.

Then, in the operation by a user (a sending executor), the panel control portion 11 displays, when the permission information is the information showing that "only after a preview image for all pages of the image data to be sent is displayed, sending of the image data is permitted", a send start key on the touch panel 32 so as to be selectable by a user only after the preview image for all pages is displayed. By setting up such a setting, sending is able to be performed only after all the pages are confirmed, thus an operational error is able to be reduced.

Herein, the preview image displayed for all pages is not limited to the one forcibly displayed according to the forcible execution information, but may be the one displayed by performing an operation such as a preview confirmation by a user (a sending executor). Furthermore, in the GUI image 45 of FIG. 5, even when the group register key 47 is selected, similarly for the description to FIGS. 6 and 7, a preview setting for each sending destination group is possible. In FIG. 8, a register example of the group K is included.

Referring again to FIG. 6, description for the GUI image 50 is to be continued. In the GUI image 50, an end key 55 and an additional register key 54 are also displayed so as to be selectable by a user. The end key 55 is the key to execute, with the contents of the current destination, a registration (recording) for the address book table 19*b* in the control memory 19 and close the GUI image 50 to return to the previous screen. For the preview setting table 19*a*, at the time when the end key 55 is selected, a formal register or an association with the address book table 19*b* may be performed. The additional register key 54 is the key to proceed to the GUI image (image similar to the GUI image 50) where an input of another sending destination is performed. Furthermore, in the GUI image 50, a cancel key (not shown) for returning to the previous screen while discarding all the registered contents (including above setting information) of the destination may be displayed so as to be selectable.

Additionally, a blank column of the preview setting key 56 in the GUI image 50 is easy for the administrator to understand that in a case where the setting is without a preview, it is left without a check, and in a case of with a preview, a check is displayed. Furthermore, in a state where the preview setting key 56 is not selected even once for the destination, the setting without preview may be made to be a default, however, in view of the security, the default is preferably to be with a preview (more preferably the sending permission conditions is also selected).

Note that, in the GUI image 50, the preview setting key 56 is selected before inputting a destination or the like, and the setting is made in the GUI image 60, and after that, in the GUI image 50, a destination or the like is input, and the destination or the like and the preview setting information may be registered in each table.

Next, description will be given for processing in a case where a user (sending executor) actually uses the digital multi-functional peripheral 1 which is in a state where the above-described system setting is made, with reference to FIGS. 9 to 13. Although description will be given mainly for a case of using an image sending function, a case of using a filing function is similar. FIG. 9 is a diagram showing an example of a standard screen in an image send mode of the digital multi-functional peripheral described in FIGS. 2 and 3.

In the GUI image 80, a copy mode selection key 81*a*, an image send mode selection key 81*b*, and a document filing mode selection key 81*c* are displayed to select an operation mode of the digital multi-functional peripheral 1, and the GUI image 80 shows a state where the image send mode is selected.

In the image send mode, various settings of conditions are possible to perform image sending. In the GUI image 80, among a scanner function, an internet FAX function, a facsimile function 82, a USB memory scan function, and a remote PC scan function, a function which a user desires is able to be selected by the user, and an example here is that the facsimile function 82 is selected.

When the facsimile function 82 is selected, in the GUI image 80, an address book key 83*a*, a direct send key 83*b*, a sub-address input key 83*c*, an original setting key 84*a*, an exposure setting key 84*b*, an image quality setting key 84*c*, a special modes key 84*d* and the like are displayed so as to be selectable by a user. Additionally, in the GUI image 80, an on-hook key 85*a* for sending by the on-hook dialing, a resend key 85*b* for resending are displayed so as to be selectable by a user.

The address book key 83*a* is a key to display a screen to select a sending destination. For a screen displayed by selecting the address book key 83*a* is not particularly shown, however, for example, it may be the one in which a list of destinations is selectable by a user for each destination (a destination group, sometimes). The direct send key 83*b* is a key for displaying a screen where a direct sending destination is input and sent. The sub-address input key 83*c* is a key to display a screen where a sub-address of the F-code communication and a passcode are input.

The original setting key 84*a* is a key for displaying a screen where a size of an original to be read or a sending size, a set direction of the original are set. The exposure setting key 84*b* and the image quality setting key 84*c* are keys respectively for displaying a screen where settings of the exposure and the image quality in original reading are made. The special modes key 84*d* is a key for displaying a screen where detailed settings in other image sending are performed. In an original reading or sending, controls according to the setting contents (sending conditions) by these are performed.

A user selects the address book key 83*a* to select a destination, and for example, the user sets an original on an ADF or a document table and when the start key 31*d* of FIG. 3 is depressed, image data read from the original by the reading portion 13 is able to be sent to the destination. It is noted that, in the present invention, the panel control portion 11 performs, before sending is started, a display control of the preview image for the touch panel 32 based on the above-described setting information.

To execute sending (actually, an original reading, for example), the start key 31*d* of FIG. 3 is depressed by a user, the main control portion 18 reads the above setting information and determines whether or not a forcible preview display is necessary. Instead of the start key 31*d*, the on-hook key 85*a*/resend key 85*b* of the GUI image 80 may be selected by a user. When not necessary, sending is executed. On the other hand, when necessary, a preview display like the GUI image 86 of FIG. 10 is performed.

Figure 10:
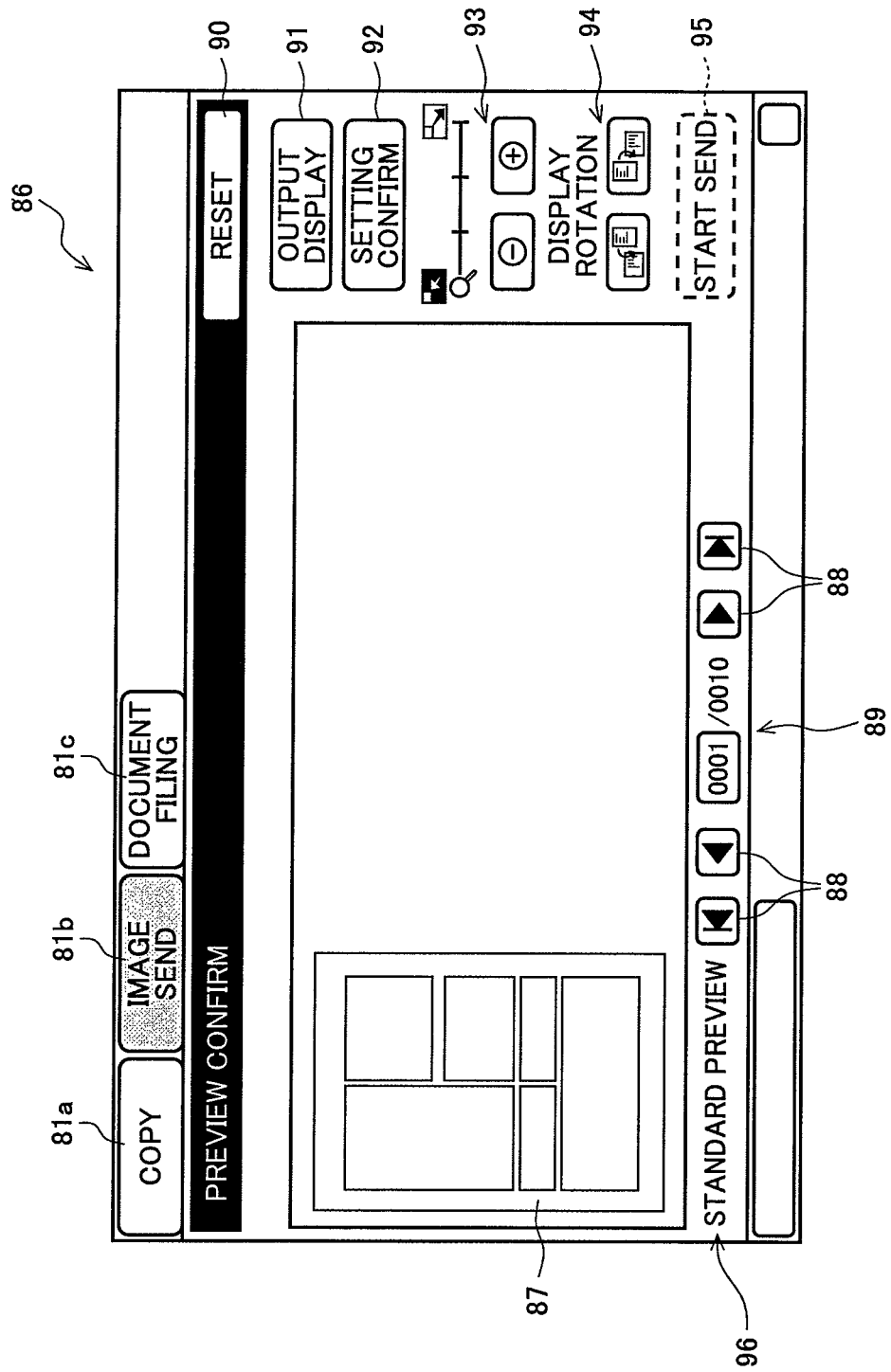
FIG. 10 is a diagram for showing an example of a preview display screen in a FAX data send mode in the digital multi-functional peripheral explained in FIGS. 2 and 3.

FIG. 10 is a diagram showing an example of a preview display screen in the FAX data send mode (facsimile function in image send mode) in the digital multi-functional peripheral explained in FIGS. 2 and 3. The GUI image 86 shown in FIG. 10 is displayed when as a result of reading the setting information (forcible execution information or display magnification value) with reference to the preview setting table 19*a* by the main control portion 18, a destination is the one (for example, the above "head office") which needs a forcible preview display by the reduction entire display. Note that, in the GUI image 86, an image 96 showing that the display is performed by the "standard preview" is also displayed.

In the GUI image 86, a preview image 87 generated by the preview image generating portion 16*a* from image data to be sent after original reading by the magnification of the reduction entire display (herein, described as the standard magnification) is displayed by the control of the panel control portion 11. The preview image data 87 is the one showing reduced image data for each page. Thereby, in the GUI image 86, together with information 89 showing the current page, a page switch key 88 is displayed so as to be selectable by a user to change a page of the image data displayed for previewing.

In the page switch key 88, a top page shift key for displaying the first page, a previous page shift key for displaying a previous page of the current page, a next page shift key for displaying a next page of the current page, and a last page shift key for displaying the last page are included. The preview image 87 is displayed for each page in this manner, and by operating the page switch key 88 as appropriate by a user, a preview image of an arbitrary page is able to be displayed. Herein, to determine whether or not the above permission information (sending permission conditions) is satisfied when the permission information of the current destination is the permission information that needs determination, the operation contents of the page switch key 88 is stored in the control memory 19 or the like until the image data is sent (or until resetting is made).

In the GUI image 86, a setting confirm key 92, an enlarging/reducing key 93, a display rotation key 94, and the like are further displayed so as to be selectable by a user, by operating these as appropriate and the user is able to confirm a setting of the preview image 87, or to confirm by enlarging/reducing or rotating the preview image 87. The operation contents of the enlarging/reducing key 93 is, when the permission information needs determination whether the permission information of the current destination is in same size enlargement, stored in the control memory 19 or the like until the image data is sent (or until resetting is performed).

Furthermore, in the GUI image 86, a finish display key 91 for performing a display of a finish state reflecting up to additional information such as header information showing the sending destination is displayed so as to be selectable. Of course, without providing the finish key 91, a preview image may be the one with an image of the additional information always added. Excluding the below-described case of a plurality of destinations, for the confirmation of the destination, the latter is more preferable.

In the GUI image 86, a reset key 90 is displayed so as to be selectable. When a necessity of resetting sending conditions arises after confirming the preview image 87, the user is able to display a GUI image for resetting the sending conditions by operating the reset key 90. Then, by resetting the sending conditions using the reset screen, the preview image 87 based on the reset sending conditions is able to be displayed.

In addition, a send start key 95 is displayed in the GUI image 86 so as to be not selectable (for example, in a gray-out manner) by a user. This example includes a case where the sending permission conditions is the confirmation of all pages. Only after all the pages are confirmed by the operation of the page switch key 88, the send start key 95 becomes selectable by a user.

Figure 11:
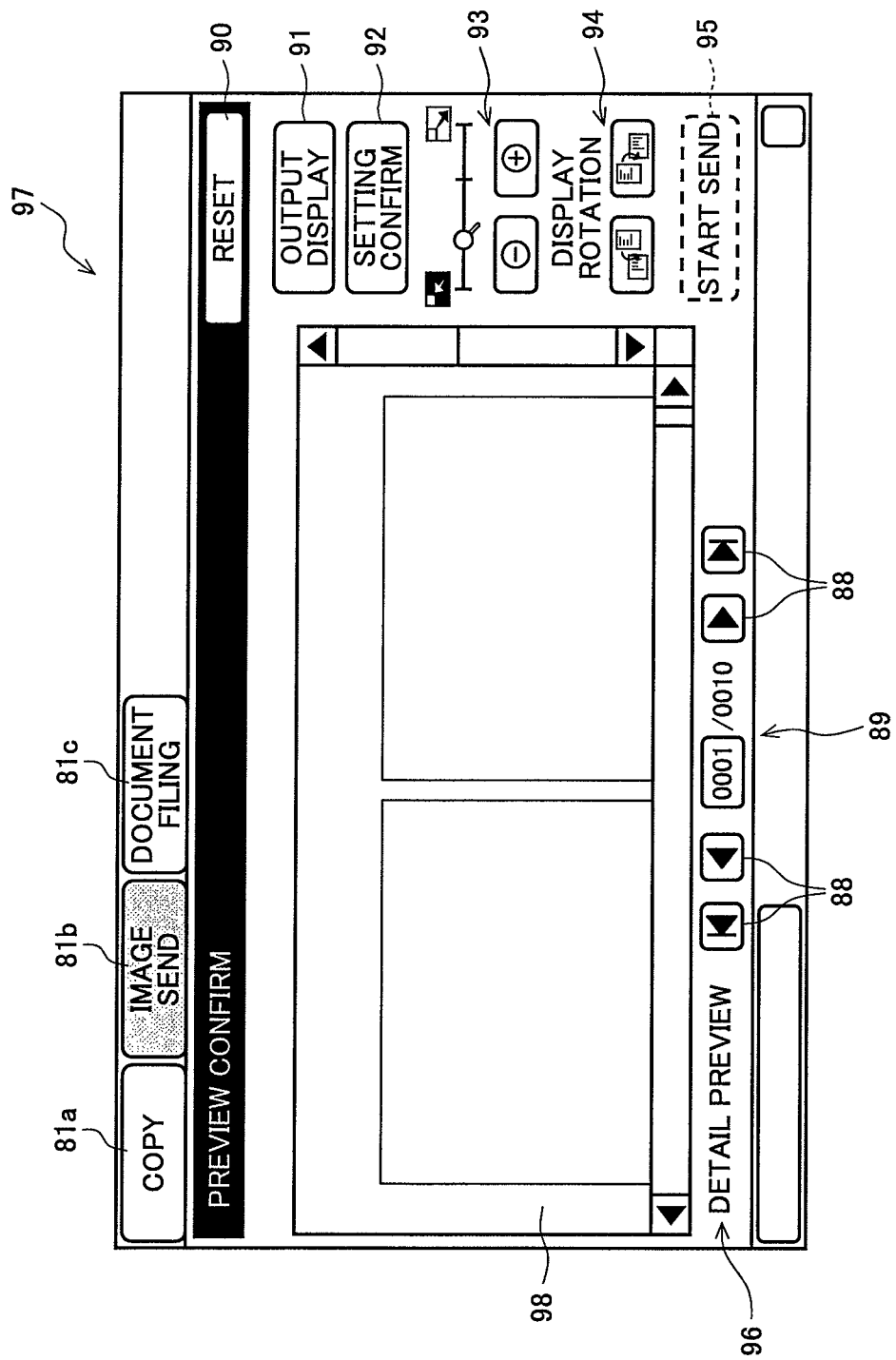
FIG. 11 is a diagram for showing another example of a preview display screen in a FAX data send mode in the digital multi-functional peripheral explained in FIGS. 2 and 3.

On the other hand, as a result of reading the setting information (forcible execution information or display magnification value) with reference to the preview setting table 19*a*, when a destination needs a forcible preview display by a magnification greater than the standard one (for example, magnification of the same size enlargement), the main control portion 18 causes the preview image generating portion 16*a* to execute the preview image generation and display a GUI image 97 such as illustrated in FIG. 11 on the touch panel 32.

FIG. 11 is a diagram showing another example of a preview display screen in Fax data send mode in the digital multi-functional peripheral 1 explained in FIGS. 2 and 3. The GUI image 97 shown in FIG. 11 is displayed in the case of a destination which needs a forcible preview display by same size enlargement magnification.

In the GUI image 97, the preview image 98 generated by the preview image generating portion 16*a* from the image data to be sent after the original reading is displayed by the panel control portion 11. In the GUI image 97, a scroll bar is also displayed and confirmation of the whole is possible by the user operation. Additionally, in the GUI image 97, an image 96 is the image showing that a display by a "detailed preview" (same size preview) is performed. Other parts are similar to the GUI image 86 of FIG. 10.

In addition, also when the sending destination input by the direct send key 83*b* is the sending destination included in the preview setting table 19*a*, a preview is preferably performed based on the setting of presence/absence of the preview or the like recorded in the table 19*a*.

Figure 12:
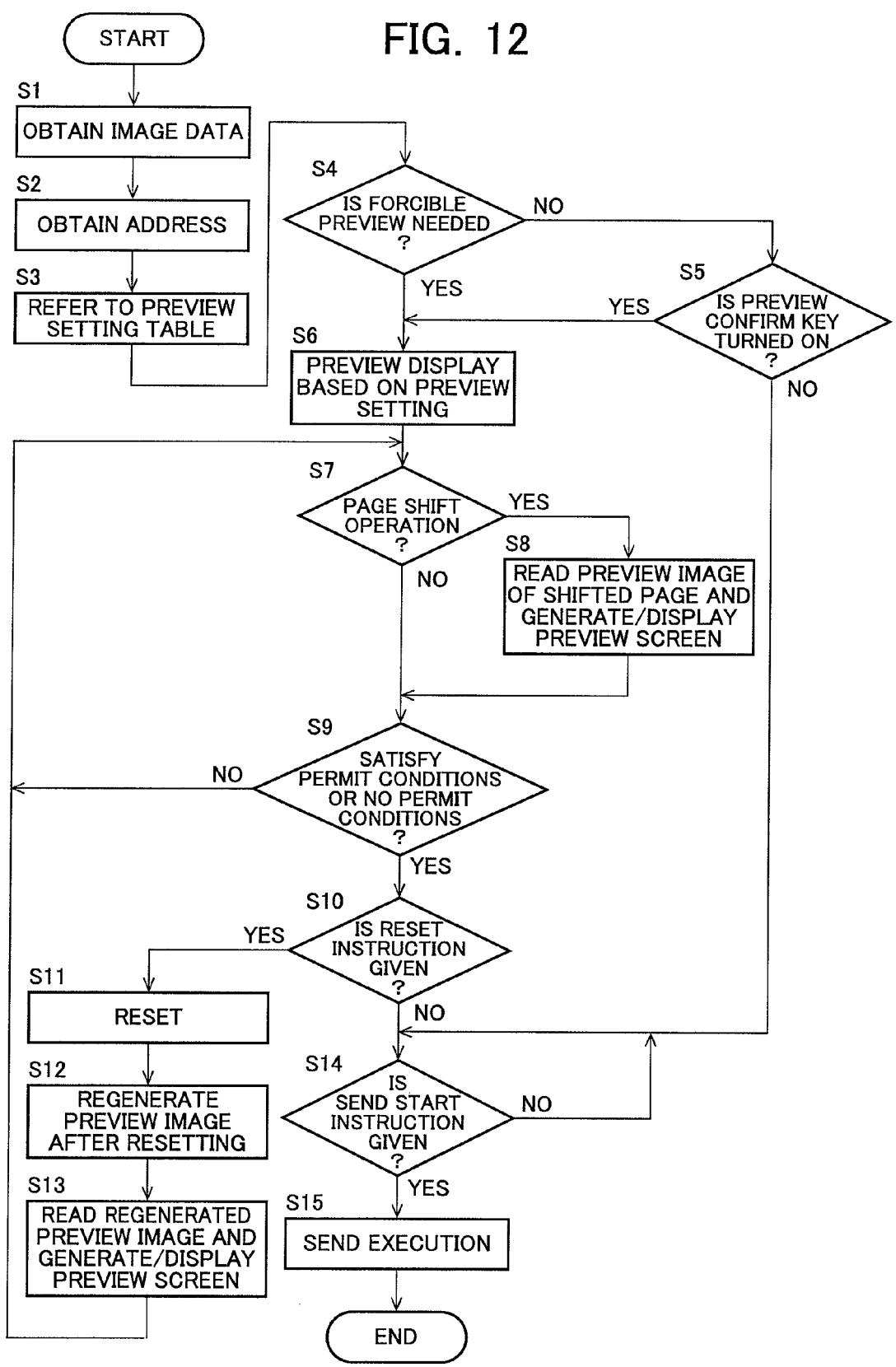
FIG. 12 is a flowchart for explaining an example of procedure for executing a preview display and sending processing for each destination in the digital multi-functional peripheral of FIGS. 2 and 3.

Next, description will be given for an example of the flow when the processing of a preview display and sending for each destination (sending destination) is executed with reference to FIG. 12. FIG. 12 is a flowchart for explaining an example of a procedure for executing the processing of a preview display and sending for each destination in the digital multi-functional peripheral of FIGS. 2 and 3.

First, the main control portion 18 obtains image data from a specified obtaining destination (for example, reading portion 13 or image storage portion 15) (step S1), and obtains an address (actually, a destination) from an address book by a user selection or a direct input (step S2). Note that, the order of step S1 and S2 are not limited.

Next, the main control portion 18 picks out, with reference to the preview setting table 19*a*, the preview presence/absence of the destination obtained in the step S2 (step S3). Then, the main control portion 18 determines whether or not a destination needs a forcible preview display (step S4).

In the case of the destination in need (in the case of YES at step S4), the main control portion 18 picks out the display magnification value and the sending permission conditions of the destination, and causes the panel control portion 11 to perform a preview display in accordance with the result of the picking out. In the case of absence of sending permission conditions, the send start key 95 may be displayed so as to be selectable by a user, and in the case of presence of the sending permission conditions, it may be displayed so as to be not selectable by a user. In the case of the latter, on the touch panel 32, the GUI image 86 including the preview image 87, for example, is displayed.

Following the step S6, the main control portion 18 waits for the user operation, and determines whether or not the page switch key 88 is selected (step S7). Here, when the page switch key 88 is selected, the main control portion 18 instructs the panel control portion 11 and the preview image generating portion 16a to generate and display a preview screen of the page (step S8). Although not shown, similarly, a preview image to which an enlarging or reducing is performed depending on whether or not enlarging/reducing key 93 is selected, may be displayed again.

In the case of NO at step S7 or after the processing of step S8, the main control portion 18 read the sending permission conditions of the current destination with reference to the preview setting table 19a, and concurrently read operation contents of the page switch key 88 and operation contents the enlarging/reducing key 93, and determine, at this point, whether the sending permission conditions is satisfied or there is no sending permission conditions originally (step S9).

In the case of NO at step S9 (in the case of not corresponding to any), the procedure returns to step S7. Note that, in the case of determining that the sending permission conditions is not satisfied at step 9, when selection of the send start key 95 which is in a gray-out manner is to be made, "Confirm all pages (by same size enlargement)" for example may be shown to prompt attention.

In the case of YES at step S9 (in the case of corresponding to any), the main control portion 18 determines whether or not there is a selection of the reset key 90 (step S10), in the case where there is (in the case of YES), after processing at steps S11 to 13, the procedure returns to step S7. At step S11, the main control portion 18 controls the panel control portion 11 to display the reset screen and waits for the reset operation of the user. At step S12, executes the reset based on the operation. At step S13, the main control portion 18 instructs the preview image generating portion 16a to regenerate the preview image which is reset and instructs the panel control portion 11 to display the regenerated preview image.

On the other hand, In the case of NO at step S4, the main control portion 18 determines whether or not the user turns the preview confirm key to be ON (step S5). Note that, the preview OK setting here is the setting just performed by the user (send executor), and it is different from the one performed by the administrator and recorded as the setting information including the forcible execution information. In this manner, it may be possible to turn the preview display ON setting by operating the preview confirm key (not shown) displayed in the GUI image 80 or the like of FIG. 9, for example, using the touch panel 32.

In the case of YES at step S5, the procedure proceeds to step S6. When a preview display is performed by the user operation, by performing the display control in accordance with the above setting information of the destination in this manner, the erroneous sending is fully managed. Alternatively, when the user turns the preview confirm key ON, a usual preview display without going through step S3 is performed (of course, page switching or enlarging/reducing, resetting and the like are received), only in the case of not turning it ON, processing excluding step S5 of FIG. 12 may be executed.

In the case of YES at step S10 or NO at step S5, the procedure proceeds to step S14, and the main control portion 18 determines whether or not the send start key 95 is selected (step S14), when instructed, instructs the NCU 23 and the modem 24 (example of FAX) to execute sending (step S15). Note that, waiting is possible until the send start key 95 is selected.

Figure 13:
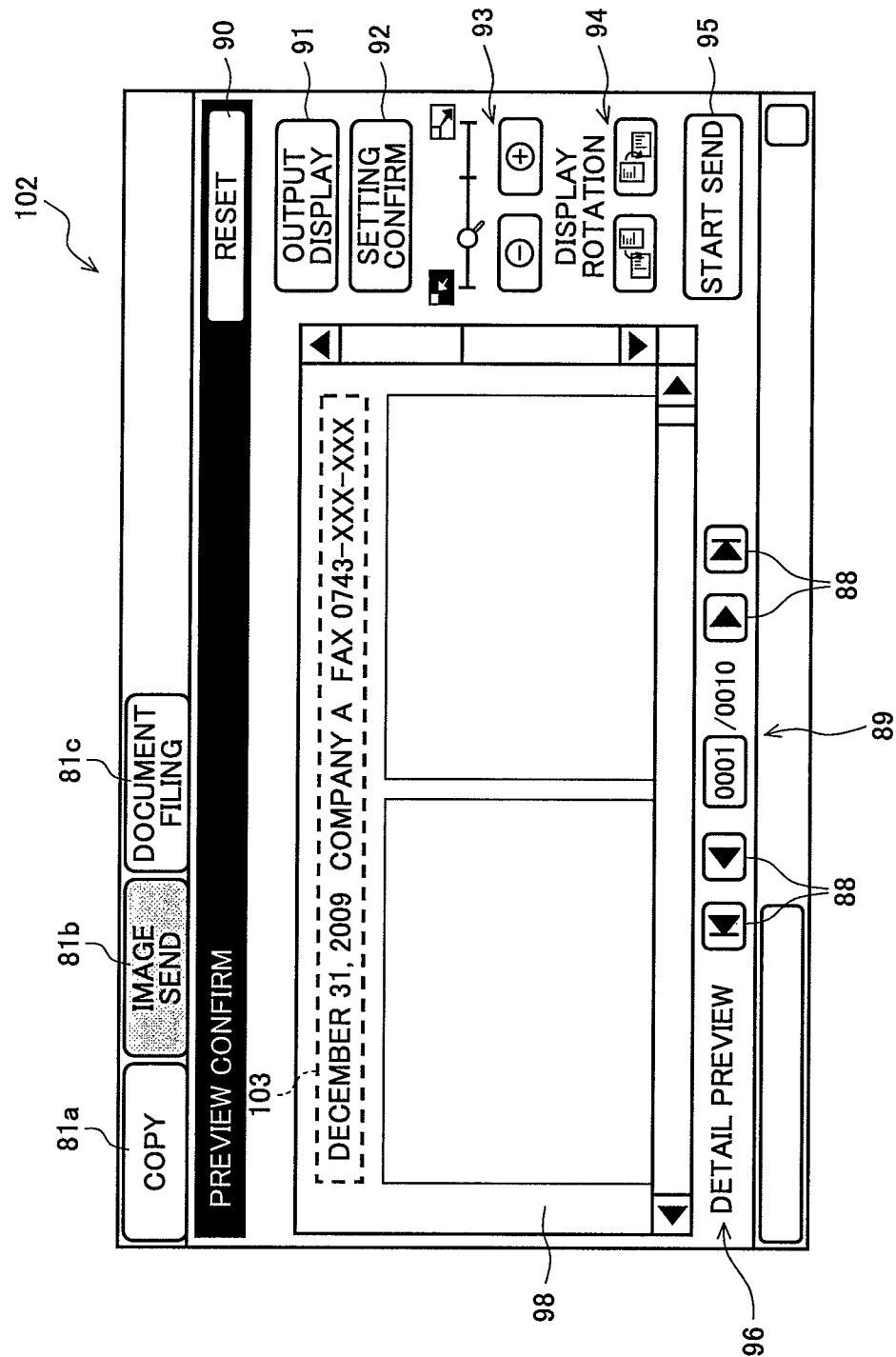
FIG. 13 is a diagram for showing an example of a preview display screen in a FAX data send mode in the digital multi-functional peripheral explained in FIGS. 2 and 3.

Next, with reference to FIG. 13, description will be given for the preview display of the additional information. FIG. 13 is a diagram showing an example of a preview display in FAX data send mode in the digital multi-functional peripheral described in FIGS. 2 and 3.

In the GUI image 102 shown in FIG. 13, header information 103 which is a kind of the additional information is added at the header part of the preview image 98. The header information 103 corresponds to, for example, a destination, a sending source and a sending date and time, which are displayed when being added and sent in a send setting set by the user. In this way, when being in a mode of sending data to the outside, such as in the FAX data send mode, additional information such as the header information 103 is often added, and it is great in need of confirming whether the additional information is not wrong and sending. Accordingly, for the destination that the confirmation of only a header by a preview is enough, a display of the header side may be performed by the same size enlargement. In this manner, not only the display magnification value but the display position may be stored as the setting information.

In the description above, it is assumed of a case where a destination in sending is one for the above setting information (a case of one group is included), a user (a send executor) may sometimes send the same image data to two or more destinations. For such a case, description will be given as another embodiment of the present invention.

The display control portion of this embodiment, when there are a plurality of destinations of image data to be sent and any one of the plurality of destinations is information showing that the forcible execution information executes a forcible preview display, displays a preview forcibly as a display control based on the setting information. Note that, there are a plurality of addresses means that there are a plurality of destinations corresponding to the above setting information. For example, when same image data is sent to both a destination A corresponding to the setting information a and a destination group B corresponding to setting information b, that applies to the above "there are a plurality of destinations".

Description will be given for a case where the display magnification value is set for anyone of the destinations. The display control portion displays, when there are a plurality of destinations of image data to be sent and when any one of the plurality of destinations is the destination in which setting information includes a display magnification value, a preview forcibly by the largest display magnification value among the display magnification values for the plurality of destinations as a display control based on the setting information. In this manner, a preview confirmation is able to be performed by employing a setting that is the easiest to view among the destinations. Similarly, when a sending permission conditions is set to any one of the destinations, start of sending may be performed only after confirmation by the same size enlargement up to the final page, or start of sending may be performed only after confirmation up to the final page in a case where the condition of "same size enlargement" is not found in any of the destinations.

Furthermore, when there are a plurality of destinations, additional information such as the header information 103 in the GUI image 102 of FIG. 13 is sometimes not able to be displayed. It is the case where the destination is included in the additional information. Accordingly, when there are a plurality of destinations, an image of additional information may not be displayed for previewing, or a preview of an image (or only an image of a part of the destination) of the additional information may not be displayed.

Hereinbefore, description has been given for the image sending apparatus according to the present invention with reference to the digital multi-functional peripheral 1, as described in the flow of the processing thereof, the present invention is employable as an embodiment of a preview display method in the image sending apparatus (illustrated as the above-described digital multi-functional peripheral 1). The digital multi-functional peripheral 1 is provided with a display portion, the preview image that generating portion that generates a preview image of image data to be sent, a display control portion for displaying the preview image generated by the preview image generating portion on the display portion, and a sending portion for sending the image data to be sent as described above.

The preview display method according to the present invention is provided with a step in which a setting storage portion stores, for each sending destination, setting information related to a preview display by a display control portion that includes forcible execution information showing whether or not a preview image is forcibly displayed by the display control portion and a step in which the display control portion performs display control based on setting information stored in the setting storage portion. Note that, an application example of the preview display method is as described in the preview display processing in the digital multi-functional peripheral 1, with description thereof omitted.

According to the present invention, in the image sending apparatus, preventing an erroneous sending effectively is able to be performed using a preview display without causing a user to feel troublesome with unnecessary confirmation operations.

The invention claimed is:

1. An image sending apparatus having a display portion, a preview image generating portion that generates a preview image of image data to be sent, a display control portion that displays the preview image generated by the preview image generating portion on the display portion, and a sending portion that sends the image data to be sent, comprising:
   a setting storage portion that stores, for each sending destination, setting information related to a preview display by the display control portion, wherein the setting information includes forcible execution information showing whether or not the preview image is forcibly displayed by the display control portion; and
   the display control portion performs display control based on the setting information stored in the setting storage portion,
   wherein when the forcible execution information shows that the preview image is forcibly displayed, the setting information includes a display magnification value in displaying the preview image by the display control portion.

2. The image sending apparatus as defined in claim 1, wherein the display control portion performs, when there are a plurality of sending destinations of the image data to be sent and any one of the plurality of sending destinations includes the forcible execution information requesting for forcible display of the preview image, a control to display the preview image forcibly as the display control based on the setting information albeit at least one of the plurality of sending destinations does not include the forcible execution information.

3. The image sending apparatus as defined in claim 1, wherein
   the display control portion performs, when there are a plurality of sending destinations of the image data to be sent and any one of the plurality of sending destinations is the sending destination in which the setting information includes the display magnification value, a control to display the preview image forcibly by the largest display magnification value among the display magnification values for the plurality of destinations as the display control based on the setting information.

4. The image sending apparatus as defined in claim 1, wherein
   the setting storage portion stores permission information, which shows whether sending of the image data is permitted only after the preview image for all pages of the image data to be sent is displayed by the display control portion or sending of the image data is permitted independent of displaying the preview image, as a part of the setting information, and
   the display control portion displays, when the permission information is information showing that sending of the image data is permitted only after displaying the preview image for all the pages of the image data to be sent, a send start key so as to be selectable by a user only after the preview image is displayed for all the pages.

5. A preview display method in an image sending apparatus having a display portion, a preview image generating portion that generates a preview image of image data to be sent, a display control portion that displays a preview image generated by the preview image generating portion on the display portion, and a sending portion that sends the image data to be sent, including:
   a step in which a setting storage portion stores, for each sending destination, setting information that is related to a preview display by the display control portion and includes forcible execution information showing whether or not the preview image is forcibly displayed by the display control portion; and
   a step in which the display control portion performs display control based on the setting information stored in the setting storage portion,
   wherein when the forcible execution information shows that the preview image is forcibly displayed, the setting information includes a display magnification value in displaying the preview image by the display control portion.

6. An image sending apparatus having a display portion, a preview image generating portion that generates a preview image of image data to be sent, a display control portion that displays the preview image generated by the preview image generating portion on the display portion, and a sending portion that sends the image data to be sent, comprising:
   a setting storage portion that stores, for each sending destination, setting information related to a preview display by the display control portion, wherein the setting information includes forcible execution information showing whether or not the preview image is forcibly displayed by the display control portion; and
   the display control portion performs display control based on the setting information stored in the setting storage portion, wherein the display control portion performs, when there are a plurality of sending destinations of the image data to be sent and any one of the plurality of sending destinations includes the forcible execution information requesting for forcible display of the preview image, a control to display the preview image forcibly based on the setting information albeit at least one of the plurality of sending destinations does not include the forcible execution information.

7. The image sending apparatus as defined in claim 6, wherein
when the forcible execution information shows that the preview image is forcibly displayed, the setting information includes a display magnification value in displaying the preview image by the display control portion.

8. The image sending apparatus as defined in claim 7, wherein the display control portion performs, when there are a plurality of sending destinations of the image data to be sent and any one of the plurality of sending destinations is the sending destination in which the setting information includes the display magnification value, a control to display the preview image forcibly by the largest display magnification value among the display magnification values for the plurality of destinations as the display control based on the setting information.

9. The image sending apparatus as defined in claim 6, wherein
the setting storage portion stores permission information, which shows whether sending of the image data is permitted only after the preview image for all pages of the image data to be sent is displayed by the display control portion or sending of the image data is permitted independent of displaying the preview image, as a part of the setting information, and
the display control portion displays, when the permission information is information showing that sending of the image data is permitted only after displaying the preview image for all the pages of the image data to be sent, a send start key so as to be selectable by a user only after the preview image is displayed for all the pages.

10. A preview display method in an image sending apparatus having a display portion, a preview image generating portion that generates a preview image of image data to be sent, a display control portion that displays a preview image generated by the preview image generating portion on the display portion, and a sending portion that sends the image data to be sent, including:
a step in which a setting storage portion stores, for each sending destination, setting information that is related to a preview display by the display control portion and includes forcible execution information showing whether or not the preview image is forcibly displayed by the display control portion; and
a step in which the display control portion performs display control based on the setting information stored in the setting storage portion, wherein the display control portion performs, when there are a plurality of sending destinations of the image data to be sent and any one of the plurality of destinations includes the forcible execution information requesting for forcible display of the preview image, a control to display the preview image forcibly based on the setting information albeit at least one of the plurality of sending destinations does not include the forcible execution information.

\* \* \* \* \*